US009295206B2

(12) United States Patent
Jovine

(10) Patent No.: US 9,295,206 B2
(45) Date of Patent: Mar. 29, 2016

(54) METHOD OF CULTURING ALGAE

(75) Inventor: Raffael Jovine, Washington, DC (US)

(73) Assignee: JOHNA LTD, Washington, DC (US)

( * ) Notice: Subject to any disclaimer, the term of this patent is extended or adjusted under 35 U.S.C. 154(b) by 570 days.

(21) Appl. No.: 13/445,698

(22) Filed: Apr. 12, 2012

(65) Prior Publication Data
US 2013/0269244 A1  Oct. 17, 2013

(51) Int. Cl.
  *A01G 7/00* (2006.01)
  *A01H 13/00* (2006.01)
  *C12N 1/00* (2006.01)
  *C12N 1/12* (2006.01)
  *C12M 1/00* (2006.01)
  *A01G 33/00* (2006.01)

(52) U.S. Cl.
  CPC ..................... *A01G 33/00* (2013.01)

(58) Field of Classification Search
  CPC ............. C12Q 2565/629; C12Q 1/686; C12Q 1/6869; B01L 2300/0816; B01L 2300/0636; B01L 3/5027; B01L 3/502715; B01L 2200/10; B01L 7/52; B01L 2200/16; B01L 2300/0864; B01L 2300/0867; B01L 2300/0887
  USPC ............. 47/1.4; 435/243, 257.1–257.6, 283.1
  See application file for complete search history.

(56) References Cited

U.S. PATENT DOCUMENTS

| 1,952,520 | A |   | 3/1934 | Urquhart |
| 3,763,824 | A | * | 10/1973 | Schoon .......................... 119/242 |
| 3,928,145 | A |   | 12/1975 | Othmer |
| 4,055,145 | A |   | 10/1977 | Mager et al. |
| 4,286,434 | A |   | 9/1981 | Moisdon |
| 4,346,561 | A |   | 8/1982 | Kalina |
| 4,726,191 | A |   | 2/1988 | Kawamura |
| 5,967,085 | A |   | 10/1999 | Kawamura |
| 5,992,089 | A |   | 11/1999 | Jones et al. |
| 8,245,440 | B2 | * | 8/2012 | Ryan et al. .................... 47/62 C |
| 8,278,082 | B2 |   | 10/2012 | Jovine |
| 8,440,439 | B2 |   | 5/2013 | Jovine |
| 2002/0131823 | A1 |   | 9/2002 | Sherman |
| 2003/0015468 | A1 | * | 1/2003 | DeBusk et al. ................ 210/601 |
| 2004/0161364 | A1 |   | 8/2004 | Carlson |
| 2010/0099170 | A1 |   | 4/2010 | Aswani |
| 2011/0281339 | A1 | * | 11/2011 | Riley et al. .................. 435/257.1 |

(Continued)

FOREIGN PATENT DOCUMENTS

| CN | 101638620 |   | 2/2010 |
| CN | 101638620 | A | 2/2010 |

(Continued)

OTHER PUBLICATIONS

Cell cycle events in the green alga *Chlamydomonas eugametos* and their control by environmental factors, by Zachleder et al, Journal of Cell Science, 102, 469-474 (1992).*

(Continued)

*Primary Examiner* — Andrea Valenti
(74) *Attorney, Agent, or Firm* — TraskBritt, P.C.

(57) ABSTRACT

The present invention relates to a method of manipulating the physiological state of algae cultured in raceway ponds by altering one or more environmental parameter to simulate algal bloom forming conditions and to raceway ponds suitable for culturing algae according to the present invention. The alteration of the one or more environmental parameters in a specifically timed manner can be used to induce and maintain synchronous cell division.

32 Claims, 2 Drawing Sheets

(56) References Cited

U.S. PATENT DOCUMENTS

| | | |
|---|---|---|
| 2011/0294196 A1 | 12/2011 | Machin |
| 2012/0028326 A1 | 2/2012 | Jovine |
| 2012/0295336 A1* | 11/2012 | Hazlebeck et al. ........ 435/257.1 |

FOREIGN PATENT DOCUMENTS

| | | |
|---|---|---|
| ES | 8605331 | 8/1986 |
| ES | 8605331 A1 | 8/1986 |
| GB | 2383978 | 7/2003 |
| GB | 2383978 A | 7/2003 |
| GB | 2464763 A | 5/2010 |
| GB | 2464763 B1 | 10/2010 |
| GB | 2486187 | 6/2012 |
| GB | 2486187 A | 6/2012 |
| JP | 56138468 | 10/1981 |
| JP | 56138468 A | 10/1981 |
| JP | 59046375 A | 3/1984 |
| JP | 59046375 A | 3/1984 |
| JP | 59165873 A | 9/1984 |
| JP | 59165873 A | 9/1984 |
| JP | 2002-262858 | 9/2002 |
| WO | 2007147028 A2 | 12/2007 |
| WO | WO 2007147028 | 12/2007 |
| WO | 2009132392 A1 | 11/2009 |
| WO | WO 2009/132392 A1 * | 11/2009 ........ C12N 1/00 |
| WO | WO 2009132392 | 11/2009 |
| WO | WO 2012019539 | 11/2009 |
| WO | 2010049687 A1 | 5/2010 |
| WO | WO 2010-049687 A1 | 5/2010 |
| WO | 2012019539 A1 | 2/2012 |

OTHER PUBLICATIONS

Synchronous Growth and Plastid Replication in the Naturally Wall-less Alga *Olisthodiscus luteus*, Published Jul. 10, 1975, Plant Physiol. (1976) 57, 497-503, by Rose Ann Cattolico et al.*

Modeling Algae Growth in an Open-Channel Raceway, Journal of Computational Biology, vol. 17, No. 7, 2010, pp. 895-906, by: Scott C. James and Varbun Boriah.*

Role of the Cell Cycle in the Metabolism of Marine Microalgae, pp. 385-406, Publication 3596 Netherlands Institute of Ecology, 2005, by: Jacco C. Kromkamp and Pascal Claquin.*

PCT International Preliminary Report on Patentability, PCT/GB2009/002568, dated Feb. 3, 2011.

PCT International Search Report and the Written Opinion, PCT/GB2009/002568, dated Jan. 7, 2010.

Response to the Examination Report for GB 2464763 dated Oct. 9, 2009.

Search Report for GB 2464763 dated Apr. 29, 2009.

Examination Report for GB 2464763 dated Oct. 12, 2009.

Patents status information for GB 2464763 printed Jun. 6, 2011.

Corrected Version of International Preliminary Report on Patentability for Application No. PCT/GB2009/002568 dated Aug. 10, 2011.

GCC Patent Office Examination Report for Application No. GCC/P/2009/14586 dated Jun. 21, 2011.

Takano et al., CO2 fixation by artificial weathering of waste concrete and coccolithophorid algae cultures, Energy Conyers Mgmt 36(6-9):697-700, 1995.

U.S. Appl. No. 13/600,425, filed Aug. 31, 2012, Raffael Jovine, Method of Carbon Sequestration.

Trade Secret Document: Jovine et al., 2013 Pre-Feasibility Study on the Establishment of an Algae Hub in South Africa SCIR/BIO/ Project No. V6BFN46 dated Aug. 10, 2013.

Falkowski P-G, and Raven J-A (2007) Aquatic Photosynthesis. Princeton University Press, Princeton.

Ryther J-H (1959) Potential productivity of the sea. Science, 130:602-608.

Maranon,E., Phytoplankton growth rates in the Atlantic subtropical gyres, Limnol. Oceanogr., 50(1), 299-310 (2005).

Barber, R.T. Sanderson, M.P. Lindley, S.T. Chai, F. Newton, J. Trees, C.C. Foley D.G. & Chavez, F.P. Primary productivity and its regulation in the equatorial Pacific during and following the 1991-1992 El Nino, Deep-Sea Research II, 43(4-6), 933-969 (1996).

Babin, M. Therriault, J.C. Legendre, L. Nieke, B. Reuter, R. & Condal, A. Relationship between the maximum quantum yield of carbon fixation and the minimum quantum yield of chlorophyll a in vivo fluorescence in the Gulf of St. Lawrence, Limnol. Oceanogr., 40(5) 956-968 (1995).

Bruyant, F. Babin, M. Genty, B. Prasil, O. Claustre H. & Bricaud, A. Garczarek, L. Holtzendorff, J. Partensky, F. Diel variations in the photosynthetic parameters of Prochlorococcus strain PCC 9511: Combined effects of light and cell cycle, Limnol. Oceanogr., 50(3), 850-863 (2005)Babin et al, 1995.

Behrenfeld, M. J., O. Prasil, M. Babin, and F. Bruyant. 2004. In search of a physiological basis for covariations in lightlimited and light-saturated photosynthesis. J. Phycol., Abstract, 40: 4-25.

Holtzendorff J., Partensky F., Jacquet S., Bruyant F., Marie D., Garczarek L., Mary I., Vaulot D. and Hess W. R., Diel Expression of Cell Cycle-Related Genes in Synchronized Cultures of Prochlorococcus sp. Strain PCC 9511. J Bacteriol. Feb. 2001; 183(3): 915-920.

Branyikova et al., Microalgae—Novel Highly Efficient Starch Producers, Biotechnology and Bioengineering, Apr. 2011, pp. 766-776, vol. 108k No. 4.

* cited by examiner

METHOD OF CULTURING ALGAE

The present invention relates to a method of manipulating the physiological state of algae cultured in raceway ponds by altering one or more environmental parameter to simulate algal bloom forming conditions and to raceway ponds suitable for culturing algae according to the present invention.

BACKGROUND

Algae have been grown in mass culture since the 1950s as a source of fertilizer (Burlow, 1953) and since then as a food source for both humans (Gershwin & Belay, 2007) and animals (Lundquist et al., 2010), and for use in water treatment (Oswald & Gotaas, 1957). However, recent interest in third generation biofuels has once again increased interest in the mass culture of algae for the creation of biomass for oil and lipid extraction (Oswald & Goluke, 1960). Furthermore, the potential use of algae for the long-term sequestration of carbon (Campbell et al., 2009) has highlighted the need for improved methods of algal mass culture (GB 2464763 published May 5, 2010, incorporated herein by reference).

Initially, commercial algae were cultivated using existing water treatment infrastructure, which consisted of natural ponds (e.g. *Dunaliella Salina*, Hutt Lagoon, Australia) and circular open air water treatment facilities (Harder and Von Witsch, 1942). However the rate of algal growth and biomass yield was found to be limited by factors including sub-optimal mixing dynamics and inconsistent gas exchange. Oblong, high-rate ponds known as raceway ponds were then developed, in which algae could be grown at a higher density (Benemann & Oswald, 1996). Raceway ponds are open ponds in which algae and water circulate around a track. Paddlewheels are used to maintain the flow of water and to keep the algae circulating to the surface and mixing the entire water mass to exchange gases with the atmosphere at a high rate. However, sub-optimal growth rates are still a problem and have prevented the mass culture of algae in raceway ponds from being commercially viable, especially on the scale required for biomass production for producing fuels (Sheehan et al., 1998), and for carbon sequestration (GB 2464763) and for the bulk production of commodity biomass production.

A raceway pond's prime advantage is its simplicity, with low production and low operating costs. However, since raceway ponds are usually completely open to the ambient environment, adverse weather (Vonshak et al., 2001) can stunt algal growth and contamination from outside organisms often results in undesirable species monopolising the cultivated algae (Ben Amotz, 2003). Contamination can be prevented by regularly cleaning the ponds, but this interrupts growing and harvesting the algae. Chemical signalling by algae, for example extracellular polysaccharide release by diatoms (Hoagland et al., 1993) as well as monosaccharide and amino acid release (Granum et al., 2002) may provide a fertile ground for bacteria and other contaminants to grow or allelopathic growth inhibiting compounds (Prince et al., 2008) can slow or stop the production of the desired algae. Furthermore, it can be very difficult to control other environmental factors such as the temperature of the water, light colour and the light intensity, resulting in photoinhibition of algal growth (Goldman, 1979).

Alternative methods have been developed in which the environmental conditions can be more closely controlled. A photobioreactor (PBR) is a closed system in which algae are grown in a controlled environment that is isolated from the ambient atmosphere, and forces the algae through thin layers to maximise their solar exposure. The exchange of gases, the addition of nutrients, algae dilution and the removal of waste products can be carefully controlled. Contamination of the algae is also minimised.

The primary objective of the highly controlled growth environment of a PBR is to achieve a very high density of algae in order to maximise productivity (Miyamoto & Benemann, 1988). However, disadvantages arise due to the high algal density. The need to constantly control parameters such as temperature, solar irradiation, exchange of gases, the addition of nutrients and the removal of waste products requires sophisticated and expensive technology. Furthermore, the unnaturally high algal densities can lead to the formation of biofilms and surface adhesion of the normally waterborne algae, which are exhibiting stress responses whereby the algae form aggregates to reduce the environmental stress of the artificial growth environment (Sukenik & Shelaf, 1984). The formation of biofilm can make a PBR difficult to clean and can clog equipment (Ben Amotz, 2008), and the high algal density can actually change the physiology of the algae resulting in the counterproductive reduction of product yield and product characteristics.

Controlling the growth environment of the algae comes at significant cost. Closed Photobioreactor (PBR) systems operate in transparent tubing, plastic bags or other walled containers. The physical drag of the water alone creates enough friction to negate the benefits of the additional yield due to the cost associated of this friction. The energetic cost of many of these systems exceed the light energy captured by the photosynthetic organisms, thereby being fundamentally unsustainable (Stephenson, et al. 2010). In addition, in high insolation environments, these closed reactor environments be they made of panels, tubes or bags experience significant heating causing new growth challenges.

In comparison, algae cultivated in open raceway ponds are usually managed to operate at relatively lower cellular densities than in PBRs, although both systems still maintain an artificially high density of algae relative to those commonly found in nature. The cell density of algae in open raceway ponds can often reach several million cells/ml in order to maintain a high standing stock of algae to supply a continuous stream that can be harvested more effectively. The density of algae cultivated in raceways ponds is often high enough that the algae respond in deleterious unforeseen ways, for example through quorum sensing where the algae aggregate to form floc that suddenly settles out in the ponds (Taraldsvik & Myklestad, 2000).

Paradoxically, natural, very large scale blooms of algae are well known and regular phenomena throughout highly diverse aquatic environments. An algal bloom occurs when a species of algae dramatically increases in number such that large areas of the ocean are numerically dominated by the algae. In comparison to the artificially controlled raceway pond and PBR growth systems described above, these natural algal blooms form in highly dynamic and complex environments, with a background of many other competing species and predators. Yet when the conditions are favourable, the algae grow exponentially, often doubling daily for two to three week periods (Platt & Subba Rao, 1970).

During these bloom events, the cellular physiology optimizes growth and maximizes the photosynthetic quantum yield, the efficiency of converting light into biomass to near theoretical maximum level of 8% for an extended period during the day (Maranon 2005). This temporary effectiveness of converting solar energy into chemical energy is a key component enabling the algae to grow exponentially. During the time of exponential growth these algae grow at a faster rate than at any other time in their lifecycle (Barber et al., 1996). They achieve the high rate of photosynthesis during a given time of day where the algae clearly distinguished stages of photosynthesis, growth and cellular division synchronized throughout the diurnal light-cycle. Algae exhibit near maximum rate of photosynthetic quantum yield, throughout the morning and through the early afternoon (Babin et al, 1995), whereas in the evening and at night time the cellular machinery is geared towards cellular growth and duplication. Consequently, during the exponential growth phase algal cellular division exhibits diurnal rhythmic behaviour (Bruyant et al., 2005).

For some species, such as diatoms, the algal cells experience wind driven mixing of the oceanic water column, while for other species such as dinoflagellates, these blooming events are combined with daily migration to deeper nutrient-rich water at night time (Eppley & Harrison 1975), followed by migration to shallower depths where more light is available for more effective photosynthesis (Kiefer & Lasker 1975). This has important consequences, as cells may be driven to have asynchronous vertical migration that maintains the growth of the bloom for a longer period of time. This cellular migration also positions the cells in the light field and nutrient regime optimally suited to a low nitrogen to carbon ratio physiological state that maximises cell mass while maintaining exponential growth (Ralston et al., 2007). Eventually, these favourable natural conditions change and the blooms collapse due to nutrient limitation, a change in the environmental conditions or predators.

The response to external stimuli such as salinity, temperature, nutrient, light or population dynamics change the algae's physiology and behaviour. The responses are directly dependent on the intensity, frequency, and combination of these environmental factors (Feng et al., 2008). Bloom-forming algae have the ability to integrate the signals they receive from these environmental signals and acclimate to the bloom-supporting conditions (Sanudo-Whilhemy et al., 2004). For example, the nutrient physiology of bloom forming diatoms (*Pseudo-nitzschia* sp.), raphidophytes (*Heterosigma akashiwo*) and dinoflagellates (*Alexandrium* sp., *Ceratium* sp), favours very rapid uptake of nutrient (high-affinity for nitrogen species) unlike many similar non-bloom forming species in the same genus (Kudela et al., 2010). In between blooms, these bloom-forming species can switch to an entirely different physiological mode where these species have much slower nutrient uptake kinetics, similar to other non-bloom forming species in the same genus.

To date, all artificial attempts to create more efficient algal growth have not attained anywhere near the efficiency of light, nutrient and resource exploitation, or photosynthetic quantum yield recorded during these natural algal blooms. The reason, we believe, is that these systems have been built to optimise environmental parameters that are not related to these bloom forming conditions. Instead, too much consideration has been given to building growth systems that address other constraints. For example, systems have been designed to grow algae with high lipid content, on expensive land (e.g., California) or high-insolation and low-water environments (e.g., Arizona), in wastewater, produced-water (saline water from mining activities) or freshwater (Sheehan et al., 1998). High cell densities to reduce the cost of harvesting, very shallow tanks to prevent self-shading and promote gas exchange, continuous growth conditions, continuous harvesting to effectively utilize the harvesting equipment, and titrated nutrient addition have all been engineered to maintain control of these growth systems. In addition, these growth systems are populated with a narrow set of hardy organisms (e.g., *Dunaliella salina, Haematococcus* sp.) that can tolerate hypersaline and high temperature conditions that occur in these closed systems.

Thus, there remains a pressing need to develop a method and apparatus for the efficient mass cultivation of algae that is commercially viable, yet simple and inexpensive.

SUMMARY OF THE INVENTION

The present inventor has concluded that many problems that are associated with the present methods and apparatus for cultivating algae can be overcome by cultivating the algae under specifically controlled conditions in which the algae are subjected to physiological changes such as those experienced during natural algal blooms.

In a first aspect, the present invention provides a method of manipulating the physiological state of algae cultured in raceway ponds by altering one or more environmental parameter to simulate bloom forming conditions. In particular, the methods of the invention simulate the photosynthetic quantum yield observed in natural algal blooms.

In one embodiment, the timing of the alteration of one or more environmental parameters is timed to coincide with a particular point in the algal cell cycle. In this embodiment, the algal population is preferably growing and dividing in a synchronous manner. Synchronous growth of the algae can be achieved as described herein or by any method known in the art (Tamiya et al., 1953, Cattolico et al., 1976). The alteration of the one or more environmental parameter can be timed to coincide with a particular point in the algal cell cycle by timing the alteration to coincide with a particular time of day, as described herein. The alteration of the one or more environmental parameters in a specifically timed manner can be used to induce synchronous cell division. The algae may then be cultured to maintain synchronisation of cellular division by providing timed alteration of the one or more environmental parameters at regular intervals to retain the physiological state of choice.

The regular intervals may be timed to coincide with points in the day such as dawn, dusk or a predetermined time before or after dawn or dusk. In an alternative embodiment, the regular intervals may be timed to coincide with particular points in the cell cycle or a particular growth state. In one embodiment, the growth state is characterised by the cellular carbon:nitrogen ratio.

In a specific embodiment, one or more of the following parameters is altered:
  a. light intensity;
  b. light colour ratio (i.e. light wavelength ratio);
  c. nutrient concentration;
  d. nutrient balance;
  e. water temperature;
  f. algal cell density;
  g. concentration of dissolved gasses; and/or
  h. ratio of dissolved gasses.

By manipulating the physiological state of algae, it is meant that the alteration of one or more of light intensity, light wavelength ratio, nutrient concentration, nutrient balance, water temperature, algal cell density, concentration of dissolved gasses and/or ratio of dissolved gasses alters the physiology of the algae. The term "one or more" includes 1, 2 or more, 3 or more, 4 or more, 5 or more, 6 or more, 7 or all 8 of the parameters listed herein.

Physiological characteristics that may be altered include growth rate, rate of cell division, photosynthetic rate, cell cycle position, rate of protein synthesis, rate of nitrogen fixation, and synchronicity of cell division in a population of algal cells. Specifically the desired physiological state is the maximal photosynthetic quantum yield, low nitrogen to carbon ratio, exponential growth rate temporarily experienced by bloom forming algae during natural bloom conditions.

Many algae may be cultured using the methods of the invention. Thus, the algae may be cultured in any type of water. In specific embodiments, the algae are cultured in seawater, hypersaline water, desalination brine, brackish water, wastewater or freshwater. The term "water" encompasses all types of water. The term "fresh water" (as opposed to freshwater) is used to mean water that has not previously been used as an algal culture medium in the methods of the invention, and encompasses fresh seawater, hypersaline water, desalination brine, brackish water, wastewater or freshwater.

In the present invention, algae are cultured in raceway ponds, which may be completely open to the ambient environment. Modifications may be made to the ponds to alter the growth environment of the algae in order recreate environmental conditions experienced by algae during natural blooms, including the light intensity and colour, the mixing regimes, variability and availability of nutrients, water temperature, algal cell density, availability and variability of dissolved gasses and other conditions that stimulate a bloom-forming environment.

In one embodiment, the modification made to the raceway pond is to the depth and/or width of the raceway pond channels. For example, the depth and/or width of the raceway ponds may be non-uniform in order to modify the flow rate and mixing in the raceway pond. The variable depth can also be used to alter the light penetration of different wavelengths of light, thus altering the light intensity and/or light wavelength ratio experienced by the algae.

In another embodiment, the rate and timing of the addition of fresh water can be controlled, and in particular fresh deep seawater, to replicate the temperature and nutrient fluctuations experienced by natural algae as they are mixed or migrate between the cold, nutrient-replete deep waters and the nutrient-depleted surface waters.

Raceway ponds used in the invention may be lined and/or covered. A liner or liners used in the present invention may be of different colours to manipulate the light wavelength ratio experienced by the algae. A cover or covers used in the present invention may be of different colours and/or opacity to manipulate the light intensity and/or light wavelength ratio experienced by the algae.

In the context of the present invention, monitoring and manipulating nutrient availability and the ratio of particular nutrients is important for assessing and modifying the physiological state of the algae. The ratio of carbon to nitrogen in the cells is a useful indicator of the ability to fix new carbon. Thus, the term "nutrient balance" includes the ratio of carbon to nitrogen in the algal cells.

In the context of the present invention, monitoring and manipulating concentration and ratio of dissolved gasses in the algal culture water is also important. In particular, growth and photosynthesis rates are strongly affected by the ratio of oxygen ($O_2$) and carbon dioxide ($CO_2$). Thus, the term dissolved gasses includes dissolved $O_2$ and dissolved $CO_2$ amongst other gasses. The ratio of dissolved gassed may be the ratio of dissolved $O_2$ to $CO_2$.

The nutrient concentration, nutrient balance, water temperature, algal cell density, concentration of dissolved gasses and/or ratio of dissolved gasses can be manipulated by adding fresh water to the raceway ponds. The timing and rate of addition of the fresh water is important in the manipulation of the physiological state of the algae.

The timing of changes to any one of light intensity, light wavelength ratio, nutrient concentration, nutrient balance, water temperature, algal cell density, concentration of dissolved gasses and/or ratio of dissolved gasses can be fixed relative to a particular time of day, e.g. dawn; dusk; a pre-determined number of hours before or after dawn or dusk; the time of peak solar irradiation; or a pre-determined number of hours before or after the time of peak solar irradiation. Alternatively, the timing of changes to any one of light intensity, light wavelength ratio, nutrient concentration, nutrient balance, water temperature, algal cell density, concentration of dissolved gasses and/or ratio of dissolved gasses can be relative to a point in the algal cell cycle or relative to a particular physiological state such as carbon to nitrogen ratio or photosynthetic rate.

Thus, algae cultivated according to the method of the present invention dynamically transition between multiple physiological states to attain high photosynthetic quantum yield, high nutrient and light utilisation, high growth efficiency, prevention of fouling, resilience to competing organisms, and ease of harvesting. In contrast, current algal culture methods aim to maintain algae in a constant and static productive state, to allow for high density growth and continual harvesting of the product algae.

In a specific embodiment of the present invention, algae are cultured in a series of connected raceway ponds arranged in stages, in which the highly productive exponential growth phase of the algae is maintained by successively diluting the growing algae population either before or when it is transferred between stages in the series of raceway ponds. These repeat dilutions maintain a low cell density of algae, thereby overcoming the problems associated with traditional high density algal culture methods and enable the growth of algae in a series of batches.

The timing of the dilution of the algae and the timing of the transfer of the algae to each subsequent stage of ponds in the series may be timed to coincide with a particular time of day, a particular phase in the algal cell cycle or an indicator like cell size relative to a particular physiological state of the algae. Timing the dilution of the algae in this manner and/or timing the transfer of the algae in this manner can be used to initiate or maintain synchronous cell division.

In a specific embodiment of the invention, the algae are cultured in a series of connected raceway ponds arranged in stages, said series of connected ponds comprising firstly, one or more stages of covered raceway ponds; and secondly, one or more stages of open raceway ponds;

wherein at each successive stage in the series, the raceway ponds have a collective volume greater than, e.g. at least two times, at least three times or at least four times greater than, the collective volume of the raceway ponds of the preceding stage;

and wherein the raceway ponds in each successive stage of the series are seeded by transferring algae grown in the raceway ponds of the preceding stage of the series such that the algae are diluted when transferred between stages in the series. In specific embodiments, the algae are diluted by a factor of at least two, at least 3 or at least 4 when transferred between stages.

In a second aspect, the present invention provides a series of connected raceway ponds for culturing algae arranged in stages, said series of connected ponds comprising firstly, one or more stages of covered raceway ponds; and secondly, one or more stages of open raceway ponds;

wherein at each successive stage in the series, the raceway ponds have a collective volume greater than, e.g. at least two times, at least three times or at least four times greater than, the collective volume of the raceway ponds of the preceding stage.

In this embodiment of the invention, the methods and series of connected raceway ponds make use of the entire algal growth cycle. Algae are first cultivated in covered raceway ponds, wherein the algae are successively diluted and transitioned into the exponential and synchronous growth phase. The covered ponds allow for the control of the algal growth medium and environment, for example temperature, light intensity and/or wavelength ratio, adverse weather and exchange of gases. Once the algae are in this highly productive exponential growth phase they are transferred to open raceway ponds where the algae grow rapidly. In order to maintain the highly productive exponential phase, the algae are successively diluted. The successive dilution may be achieved by increasing the volume of water in the current stage of raceway ponds or by transferring the algae to the next stage of ponds in the series, thereby diluting the algae by seeding a larger volume of ponds and filling those ponds to capacity by the addition of fresh water. This maintains a low cell density of algae in the raceway ponds which allows the algae to sustain much higher growth rates than in traditional systems, and preferably allows the algae to remain in the exponential growth phase. The alteration of the algal cell density can also be timed to mimic the conditions found in natural oceanic blooms.

The present invention may also comprise a step of harvesting the algae. Once the algae have reached maturity, or the stage at which harvesting of the algae is required, the algal environment is modified in order to induce a change in the algae from the exponential growth phase to the stationary phase. This is achieved by mimicking the environmental conditions under which a natural algal bloom will collapse. The present invention also provides methods for harvesting the algae once they are no longer in the exponential growth phase.

The present invention solves several problems from which current algal cultivation methods suffer. By avoiding the artificially high growth density environments of the traditional methods of algal culture, the complex and expensive systems required to maintain the high algal cell densities are not required. Furthermore, by not creating such artificially high growth density environments, algae cultivated using the method of the present invention and the series of connected raceway ponds of the present invention can sustain much higher growth rates than in traditional systems. The methods of the present invention require low capital expenditure and have low operational costs, while producing significant quantities of algae such as to make large-scale algal culture commercially viable.

DETAILED DESCRIPTION OF THE INVENTION

Raceway Ponds

Figure 1:
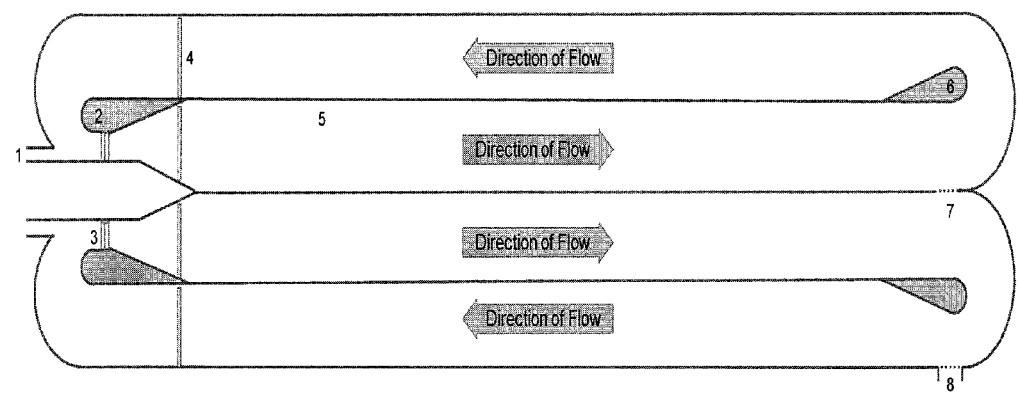
FIG. 1: A raceway pond with four channels. Features include:
1) Gate controlled sluice for pond intake from either a seawater canal and/or the previous ponds
2) Utility Island and flow diverter
3) Variable speed and depth paddlewheel
4) CO2 reticulation, countercurrent sump, or Air Sparged Hydrocylone spanning across both channels of each pond
5) Plastic covered and reinforced walls or berms to form the pond walls and channels divider
6) Flow diversion island to maintain laminar flow
7) Gate controlled pond-to-pond shunt for drainage and cleaning
8) Pond discharge through gate controlled sluice

The present invention makes use of raceway ponds. A typical raceway pond is illustrated in FIG. 1. Raceway pond is oblong shaped, with a partial divide in the middle of the pond (5) (along the longitudinal axis) to create a circuit with at least two channels. At one ends of this divide there is a service island (2) that serves both as an anchor for the paddlewheel, the platform for the $CO_2$ equipment and as a flow diverter. At the other end of the divide is a second flow diverter (6) to ensure laminar flow throughout the raceway. Paddle wheel (3) maintains the flow of water and algae around the circuit.

The present invention preferably makes use of open and/or covered raceway ponds. A covered raceway pond may be covered by any suitable means, such as a plastic cover or a membrane. In one embodiment, the cover is translucent in order to maximise algal solar irradiation. In other embodiments, the opacity of the cover is increased to obscure 10-90%, 20-80%, 30-70%, or 40-60% of the incident light. For example, the cover may obscure up to 10, 20, 30, 40, 50, 60, 70, 80, 90 or 100% of the incident light.

In one embodiment, a covered raceway pond is a raceway pond covered by a greenhouse. The primary purpose of the greenhouse is to protect the seed algae from being contaminated by windborne contaminants or bird-borne contaminants. Secondly the greenhouse is used to raise the temperature of the algal growth environment; firstly to increase the algal growth rate, and secondly to inactivate competing or deleterious organisms that might otherwise contaminate the algae or foul the equipment. The greenhouse can also be used to selectively shade or change the illumination colour of the algae to induce a desirable physiological state by altering the light wavelength ratios. In one specific embodiment, every covered raceway pond is covered by a greenhouse.

An open raceway pond has no external cover, and as such is fully exposed to the ambient atmosphere, while a covered raceway pond (which may be fully or partially covered) allows partial or complete control of the temperature and light environment.

In one embodiment, each covered and/or open raceway pond has two channels. As raceway ponds increase in volume they have increased width and/or length and/or number of channels. In a specific embodiment, as open raceway ponds increase in volume they have increased width and length, and the number of channels also increases. An open raceway pond of the present invention may have 2, 4, 6, 8, 10, 12, 14, 16, 18 or 20 channels (not including the return channel).

In a specific embodiment, both covered and open raceway ponds have a width to length aspect ratio of between 1:4 and 1:12, preferably 1:8. At this ratio, there is relatively low head loss at each paddlewheel pumping station as the water circulates around the bends, favourable economy of the construction materials (straight walls are easier to build than the bends), the reduction of wind influence as it blows across the pond (to prevent potentially unmixed zones). The width of approximately 30 meters per channel also reduces meandering flow to avoid unmixed areas. $CO_2$ reticulation may be provided at regular intervals (Weissman and Goebel, 1987; Benemann and Oswald, 1996).

Paddlewheels may be used to maintain the flow of the algae and water around the covered and open raceway ponds. This is energy efficient whilst ensuring thorough mixing and the exposure of the algae to relatively low shear. This enables effective exchange of gases within the ambient air with the algae growth medium. According to the species being cultivated, different rate paddle wheels may be used. The paddlewheel rate may be 5-40 cm/sec, e.g. 10-30 cm/sec, or 15-25 cm/sec. For example, cells with more rapid cell division require a higher paddlewheel rate of up to 30 cm/sec, while cells such as flagellates with a slower growth rate prefer a slower rate of around 20 cm/sec. In one embodiment, each covered or open raceway pond preferably has 1, 2, 3, 4, paddlewheels depending on the degree of agitation that is required. Preferably, each raceway pond has one paddle wheel. The paddlewheel may be positioned at any section of the raceway pond, but is preferably positioned closer to the narrower end of a raceway pond.

In one embodiment, one or more paddlewheel maintains the flow of the algae and water within a covered and/or open raceway pond at a rate of about 5-40 cm/sec, for example 10-30 cm/sec, or 15-25 cm/sec or 20 cm/sec, 25 cm/sec or 30 cm/sec.

In one embodiment, a covered raceway pond has volume of between 50 l and 15,000,000 l, for example between 50 l and 50,000 l. In a particular embodiment, the volume of the covered raceway ponds in the series increases such that there is at least one pond in the series with a volume of (a) 50-1,000 l; at least one covered raceway pond in the series with a volume of (b) 100 l-5,000 l; and at least one pond in the series with a volume of (c) 5,000 l-50,000 l. In one embodiment, these ponds are linked in a linear fashion, such that there is one pond at each stage in the series.

In one embodiment, an open raceway pond has volume of between 1,500,000 l and 3,000,000 l, in a further embodiment between 6,000,000 l and 12,000,000 l. In a still further embodiment, the volume of the open raceway ponds in the series increases such that there is at least one open raceway pond in the series with a volume of (a) 360,000-720,000 l; at least one pond in the series with a volume of (b) 1,500,000-3,000,000 l; and at least one pond in the series with a volume of (c) 6,000,000-12,000,000 l.

The depth of a raceway pond affects algal solar irradiation. Both light intensity and the light wavelength ratio are altered by increasing water depth. In general, far red, red and ultraviolet light are absorbed the most rapidly by the water and a blue and green light penetrate the furthest. In one embodiment, a covered or open raceway pond is between 0.05 m and 10 m deep, for example, 0.05 m, 0.10 m, 0.20 m, 0.30 m, 0.40 m, 0.50 m, 0.60 m, 0.70 m, 0.80 m, 0.90 m, 1 m, 1.5 m, 2 m, 3 m, 5 m, or 10 m deep. In one embodiment, a covered raceway pond is 0.1 m-1 m deep, for example 0.1 m, 0.2 m, 0.3 m, 0.4 m, or 0.5 m deep. In one embodiment, an open raceway pond is 0.3 m-1 m deep, for example 0.3-0.4 m. Preferably an open raceway pond is less that 1 m deep. At this depth there is sufficient outgassing of $O_2$ to help reduce oxidative stress, also at this depth there is sufficient exposure to dissolve atmospheric $CO_2$.

Open raceway ponds of the present invention may be further modified in order to maintain the algae in their exponential phase of growth. Open raceway ponds are usually symmetrical, with channels of identical size. However, the present inventor has discovered that if the width of a channel is significantly different from its adjacent channel very different flow rates in adjacent channels and turbulence within the flow in the channels result. In one embodiment of the present invention, the width of adjacent channels in an open raceway pond is non-uniform, resulting in a change in the flow rate through the non-uniform section of that raceway pond. This change in flow rate mimics the transition of algae in natural blooms from the mixed layer depth to conditions below the pycnocline and back again. This increased algae agitation also changes the abundance of dissolved gases in the growth medium, encouraging $CO_2$ from the atmosphere to dissolve in the water, and $O_2$ dissolved in the water to be released to the atmosphere, thereby sustaining algae growth.

Raceway ponds known in the art are also usually uniform in depth. However, the present inventor has discovered that if the depth of a raceway pond is varied along the length of a channel or between adjacent channels, a change in the flow rate results. Furthermore, the exposure of the algae to solar irradiation is varied, with algae in shallower areas of the raceway pond experiencing greater light intensity and a greater proportion of red light than algae in deeper areas. This variation in depth mimics the natural algal transition from deep nutrient rich seawater to provide the appropriate signals to maintain the productive physiological state and to maximise photosynthetic output. Photosynthetic output can be affected by the light ratio, especially at dawn and dusk, and as discussed herein the depth of the water alters the light wavelength ratio.

Thus, in one embodiment, the depth of an open raceway pond is non-uniform, resulting in a change in algal exposure to light both in terms of light intensity and light wavelength ratio and/or a change in the rate of gas exchange within the non-uniform section of the raceway pond. In one embodiment, the difference between the depth in adjacent channels is 0.05-1.0 m, for example 0.05 m, 0.10 m, 0.2 m, 0.3 m, 0.4 m, 0.5 m, 0.6 m, 0.7 m, 0.8 m, 0.9 m or 1.0 m. For example, one channel is 0.2-0.5 m deep, while the adjacent channel is 0.8-1.0 m deep. Alternatively, the difference in depth need not be between adjacent channels, but could be along the length of an individual channel or be between channels which are 1-10, e.g. 2-9, 3-8, 4-7 or 5-6 channels apart, or specifically 1, 2, 3, 4, 5, 6, 7, 8, 9 or 10 channels apart.

As described herein, the raceway ponds of the present invention may be lined. In one embodiment, covered and open raceway ponds are lined with an impermeable material. If seawater is used to culture the algae, a clay lining may be used to prevent saltwater intrusion onto the land. In one embodiment, a plastic waterproof lining is used instead of, or in addition to, a clay lining. In a particular embodiment, each raceway pond is lined with 10-20 cm of clay and a 2-5 cm, e.g. about 3 cm or specifically 36 mm, robust synthetic liner such as HDPE.

In one embodiment, the colour of the pond liners may also be chosen to alter the light wavelength ratio experienced by the algae as it reflects off the bottom of the ponds. The colour of the liner may selectively increase or decrease exposure of the algae to underwater red (630-680 nm), far red (700-750 nm) and/or blue (400-450 nm) light. In one embodiment, the liner selectively increases the exposure to underwater red (630-680 nm), far red (700-750 nm) and/or blue (400-450 nm) light by 10-90%, 20-80%, 30-70%, or 40-60%. For example, the liner may selectively absorb up to 10, 20, 30, 40, 50, 60, 70, 80, 90 or 100% of the incident underwater red (630-680 nm), far red (700-750 nm) and/or blue (400-450 nm) light before the remaining light is reflected through the algal growth environment again.

In a second embodiment, the lining is white in order to reflect light off the bottom and maximise the light available for photosynthesis and encourage algal growth especially in the low density cultures and/or shallow cultures less than 30 cm deep, where light will penetrate the depth of the medium. Black liners may be used to deliberately increase the temperature of the cultivation medium, for example, for the accelerated growth of *Dunaliella salina* in desalination brine.

Different colours of lining may be used to induce different physiological effects in the algae. For example, the lining may be entirely red, blue or green. Alternatively, a single stage in the sequence of ponds can be coloured blue, for example at the point where the seed algal growth has been synchronised in the initial covered ponds, to reinforce cellular growth synchronisation and increase growth before cell division, just before the cells are introduced into the open growth ponds so that multiple divisions then occur in the growth pond. Similarly, the growth pond can be lined in blue to stimulate the migration of chloroplasts to the outside of the cells, to promote maximum photosynthesis (Kraml & Hermann, 1991; Furukawa et al., 1998).

The Series of Raceway Ponds

In one embodiment, the present invention provides a series of connected raceway ponds, arranged in stages. The raceway ponds are connected in such a way so as to allow water and algae to pass directly between raceway ponds in successive stages of the series. However, the connection between raceway ponds can be closed and each raceway pond can be an isolated growth environment. The flow of water and algae between successive stages in the series is unidirectional, i.e. the passage of algae and water through the connected series of raceway ponds is one-way and algae and water are never re-circulated.

In one specific embodiment of the invention the series of connected raceway ponds of the present invention comprises firstly, one or more stages of covered raceway ponds and secondly, one or more stages of open raceway ponds. The designations of "firstly" one or more stages of covered raceway ponds of covered raceway ponds and "secondly" one or more stages of covered raceway ponds open raceway ponds indicate that within the series of connected ponds, the stages comprising covered raceway ponds will always come before the stages comprising open raceway ponds. Put another way, an open raceway pond will never be succeeded by a covered raceway pond.

The present inventor has found that in order to maintain algae in the exponential growth phase, the algae must be successively diluted in order to maintain a low algal cell density, thereby mimicking natural algal bloom conditions and maintaining cellular physiology that promotes rapid growth. This successive dilution can be achieved by increasing the collective volume of the raceway ponds in each stage of the series. This increase in collective volume can be achieved by increasing the volume of the individual raceway ponds in each successive stage of the series and/or by increasing the number of raceway ponds in each successive stage of the series. Thus, at each successive stage in the series of raceway ponds of the present invention, each individual raceway pond has a volume greater than the volume of the individual raceway ponds in the preceding stage of the series; and/or each raceway pond is immediately succeeded by a greater number of raceway ponds, wherein the collective volume of the raceway ponds in any given stage exceeds the collective volume of the raceway ponds of the preceding stage.

Timing the dilution of the algae to coincide with a particular time of day or a particular point in the cell cycle or a particular physiological state also mimics natural bloom formation. The timing of the alteration of light intensity, light wavelength ratio, availability and concentration of nutrients, nutrient balance, concentration of dissolved gasses and/or ratio of dissolved gasses can be used to induce and/or maintain synchronous cell growth and cell division.

In the context of this invention, the volume of a raceway pond is defined as its capacity (i.e. the volume of fluid a raceway pond is capable of holding) rather than the volume of fluid actually held in the raceway pond at any given time. When algae and water are transferred from a raceway pond (covered or open) in one stage of the series to one or more raceway ponds (covered or open) in the next stage of the series, either the algae and water are transferred to a single raceway pond with a greater volume, or the algae and water are divided between a number of raceway ponds with a larger collective volume. Each transfer of the algae and water from one stage of the series to the next stage in the series thus involves dilution of the algae or is preceded by dilution of the algae in the current stage of ponds.

In one embodiment, when the algae and water from one stage in the series is used to seed the raceway pond or raceway ponds of the next stage, it is transferred to the raceway pond or raceway ponds of larger volume in the next stage of the series. Water is added to, or is already present in, the raceway ponds to be seeded, such that the final volume of fluid within the raceway ponds after seeding is equal to its capacity. This seeding step results in the algae being diluted and a low algal cell density can thus be maintained. Maintaining this constant low cell density of algae prevents the problems associated with traditional high-density algal culture, such as quorum sensing, biofilm formation and other (often unpredictable) algal stress responses.

In an alternative embodiment, the algae are diluted prior to being transferred to the next stage of ponds. In this embodiment, fresh water is added to the current stage of ponds to dilute the algae.

The successive dilution of the algae at each seeding step should not be taken to mean that the algal cell density at each stage in the series is successively reduced. Since the algae multiply rapidly, despite the successive dilutions at each seeding step the approximate cell density of algae in each stage of raceway ponds going through the series may increase, decrease or remain the same.

In a specific embodiment, there are at least two stages of covered raceway ponds in the series of connected raceway ponds. For example, there may be 2, 3, 4, 5, 6, 7, 8, 9, 10, 15 or 20 stages of covered raceway ponds. In one embodiment, there are 2-10 stages of covered raceway ponds, 4-8 stages of covered raceway ponds, or 5 stages of covered raceway ponds.

In a preferred embodiment, the covered raceway ponds are preferably greenhouse covered and are connected in linear succession, wherein there is one covered raceway pond at each stage in the series of covered raceway ponds. In this embodiment, each covered raceway pond is at least 2 times, for example 2 to 5 times, the volume of the covered raceway pond of the previous stage in the series. In a specific embodiment, the each covered raceway pond is 2, 3, 4, or 5 times volume of the covered raceway pond of the previous stage in the series.

In a further specific embodiment, there are at least two stages of open raceway ponds in the series of connected raceway ponds. For example, there may be 2, 3, 4, 5, 6, 7, 8, 9, 10, 15 or 20 stages of open raceway ponds. In one embodiment, there are 2-10 stages of open raceway ponds, 4-6 stages of open raceway ponds, or 5 stages of open raceway ponds. In one specific embodiment, there are more open raceway ponds than closed raceway ponds in the series.

In a particular embodiment, the number of open raceway ponds in each stage increases at each successive stage in the series. In this embodiment, each open raceway pond is connected to two or more open raceway ponds in the next stage in the series, and the collective volume of each of the two or more open raceway pond exceeds the volume of the raceway pond in the preceding stage. Therefore, in this particular embodiment, the algae and water in one open raceway pond is diluted into two or more open raceway ponds when the algae and water are transferred between stages in the series.

In a specific embodiment, the number of open raceway ponds in each stage of the series doubles. Therefore, in this embodiment the number of raceway ponds at each stage in the series increases exponentially. For example, the number of open raceway ponds at each stage increases as follows: 1, 2, 4, 8, 16, 32, 64, 128. In this embodiment, as the number of open raceway ponds at each stage increases, so does the volume of each individual raceway pond. In a preferred embodiment, the volume of the individual open raceway ponds in one stage is at least two times, preferably four times, the volume of the individual open raceway ponds in the previous stage. In an alternative embodiment, the volume of the individual open raceway ponds at each stage in the series remains the same, although the collective volume of the raceway ponds increases with each stage as the number of raceway ponds increases.

The algae and water may be transferred between raceway ponds in successive stages of the series without any external force, for example it may be transferred under the influence of gravity. However, the algae and water will, on occasion when the local topography does not permit the use of gravity transfers, be pumped from one raceway pond to another, using any suitable pumping means.

Algal Flow and Algal Lifecycle Management

Algae may be cultivated in seawater, hypersaline water, desalination brine, brackish water, wastewater or freshwater. The choice of water for the culture medium will depend on the algae being grown. Algae will be grown in water that replicates their natural growth environment.

Preferably, the algae are cultivated in seawater in order to replicate the conditions under which natural oceanic algal blooms occur. Seawater, particularly deep coastal seawater, is nutrient rich and may be used not only as a medium in which to grow the algae, but also as a way of providing the algae with nutrients. When seawater is used, the seawater may be seawater that is pumped from offshore at depth below the mixed layer depth, the nutricline, the pycnocline or the euphotic zone depending on the local hydrography. Water from this depth is used to increase the nutrient content of the water; and reduce the load of contaminants such as competing organisms, predators and viruses and other biological matter that might interfere with the growth of the algae; and reduce infochemicals excreted by other algae or organisms such as dimethylsulphide that might interfere in the regulation of cellular physiology or algal growth.

Seawater may also be used to control the temperature of the algal growth environment. For example for algae that perform diurnal migrations to the bottom of the euphotic zone to access more abundant nutrients there, also experience a regular temperature cycle where they are cooler at night when they are absorbing nutrients and warmer during the day when they are absorbing sunlight near the surface. To mimic these conditions, fresh, cold seawater can be added to the sun-warmed growth medium in the ponds on a regular basis to induce a temperature fluctuation similar to those experienced during diurnal migration of the algae. This is also important for the maintenance of the synchronisation of cell growth.

Once the seawater has circulated through the series of connected raceway ponds, it is cleaned of algae and returned to the warmer ocean surface water, down-current at a distance from the intake to avoid intake of water that has already been used for cultivation of the algae.

In one embodiment according to the present invention, algae are first cultivated in at least one stage of covered raceway ponds. The covered raceway ponds allow for the control of the algae growth environment. The water used to fill the covered raceway ponds may be filtered or otherwise treated to remove competing and deleterious organisms before being introduced into the covered raceway ponds.

In one embodiment, greenhouses are used to cover the raceway ponds and as a result the algae environment is maintained at a higher than ambient temperature. In this embodiment, the temperature within the covered raceway ponds is between $25°$ C. and $45°$ C., for example $38°$ C. and $40°$ C. This will substantially inactivate organisms acclimated to temperatures of $4°$ C.-$10°$ C. when they are pumped from depth off-shore. Advantageously, covered raceway ponds are less susceptible to contamination, either by bacteria or viruses, or by potentially competing organisms. The relatively controlled environment of the covered raceway pond promotes the algae transitioning into the exponential growth phase.

As the algal cellular density increases, the algae are successively diluted, preferably by being transferred between stages in the series of covered raceway ponds to covered raceway ponds of successively larger volume. This successive dilution maintains a relatively low cell density of algae, for example between 100,000 cells/ml and 2,000,000 cells/ml, for example about 350,000 cells/ml. Each transfer of the algae to seed a covered raceway pond in the next stage of the series (i.e. the successive dilution of the algae) is timed to match the growth rate of the algae. In one embodiment, the cell density of algae in each covered raceway pond is between 1,000 cells/ml and 2,000,000 cells/ml. In one embodiment, algae reside in each stage of covered raceway ponds for 2 hours to 10 days, for example 2 hours, 3, hours, 5 hours, 12 hours, 24 hours, 36 hours, 2 days, 3, days, 5 days or 10 days. In one embodiment, the algae reside in each covered raceway pond for two days, before being transferred to a raceway pond of larger volume. In one embodiment, algae remain in a covered raceway pond for a length of time sufficient for the algae cellular population to at least double, for example 2 hours, 4 hours 12 hours, 24 hours, 36 hours or 48 hours. In a specific embodiment, algae remain in a covered raceway pond for 24 hours before being transferred to the next stage in the series.

Once the algae enter the exponential growth phase, or when sufficient quantities of algae have been cultivated, the algae are transferred to the first stage of open raceway ponds. In one embodiment, the algae and water are transferred in volumes of 1,000 l to 3,000,000 l, for example 360,000 l to 720,000 l, into the first stage of open raceway ponds. The transfer of a relatively large bolus of algae is intended to seed the open raceway ponds to populate the growth environment with a large excess of several orders of magnitude of the product algae relative to any surviving organisms that were within the source water used in the open raceway pond thereby establishing a robust population.

Algae are preferably diluted with fresh seawater in the late afternoon on a first day, before, at or around dusk (so the algae have just completed a cell cycle), but before dawn or sunrise on the second day. The dilution of the algae is performed to either maximise nutrient exposure and control light signalling in the morning, for example for flagellates or nitrogen fixing algae, or in the afternoon for rapid growing algae such as diatoms. By timing the dilution in this way, the algae have time to acclimatise to their new growth environment in the next stage of raceway ponds and continue the exponential growth. The timing can also reinforce the synchronous growth of the algal cell population.

The algae may be diluted by introducing additional water into the current stage of ponds, increasing the volume of water contained within that stage. Alternatively, the algae may be diluted by transferring the algae to the next stage of ponds and mixing the algae with water already present in those ponds.

Algae in an open raceway pond are successively diluted by increasing the volume or number of open raceway ponds in each stage of the series. This serial dilution maintains the algae at a low enough cell density to sustain exponential growth. In one embodiment, the algae are successively diluted to maintain a cell density of 50,000 cells/ml to 100,000 cells/ml, for example 200,000 cells/ml to 250,000 cells/ml. This approach is completely different to current methods of cultivating algae in which the algae are grown to artificially high densities often reaching cell densities of over 1 million cells/ml.

In one embodiment, algae reside in each stage of raceway ponds for 2 hours to 10 days, for example 2 hours, 3, hours, 5 hours, 12 hours, 24 hours, 36 hours, 2 days, 3, days, 5 days or 10 days before being transferred to the next stage of raceway ponds in the series. In a specific embodiment, algae remain in a raceway pond for 48 hours before being transferred to the next stage of raceway ponds in the series. In one embodiment, algae remain in a raceway pond for a length of time sufficient for the algae cellular population to at least double, i.e. for one round of cell division to take place. In a specific embodiment, the algae remain in a raceway pond for a length of time sufficient for one, two, three, four or five rounds of cell division to take place. This may be, for example, 2 hours, 4 hours 12 hours, 24 hours, 36 hours, 48 hours, or 72 hours.

This successive dilution of algae maintains a low cell density which advantageously maintains the exponential growth phase, thereby increasing productivity. Furthermore, the problems associated with high-density algal culture methods such using traditional raceway ponds and PBRs are avoided.

With each successive dilution of the algae, water is added to, and/or is already present in, the covered and open raceway ponds in the next stage in the series. Following the transfer of the algae and water from one stage to seed the next stage in the series, the volume of fluid within each covered and open raceway pond is equal to its capacity. In one embodiment, the entire volume of water in an open and/or covered raceway pond is replaced every 2 hours to 8 days, preferably every 24 to 72 hours. In a preferred embodiment, the volume of water passing through the series of connected covered and open raceway ponds in 24 hours is greater than 20-50% of the entire volume of the series of covered and open connected raceway ponds, e.g. greater than 30% of the entire volume of the series of covered and open connected raceway ponds, for example greater than 50% for both seed and growth ponds. This exchange rate of water is much higher than in traditional raceway ponds, where the water replacement rate is usually around 0-20% in 24 hours, in order to match the growth rate of the cells and rate of evaporation.

This high volume of water exchange has several advantages. In traditional raceway ponds a high cell density of algae is maintained and any contamination can potentially render the entire raceway pond un-harvestable. However, the series of raceway ponds of the present invention is inherently resilient, as small degrees of contamination do not matter since all of the contaminants are inevitably washed out of the series of ponds, and none of the product algae is reintroduced into the series of raceway ponds.

Preferably, seawater is used to culture the algae, as the high volume of seawater exchange has particular advantages. Firstly, seawater can be used to manage the temperature of the algal growth medium, since significant volumes, for example 75% of the volume of a raceway pond, of fresh, cold, deep seawater are added to each raceway pond prior to being seeded from algae grown in raceway ponds in the previous stage in the series. This addition of cold water mimics the vertical migration of algae from water surfaces to colder, nutrient rich water in natural oceanic algal blooms and the repeat cyclical temperature fluctuation contributes to the recreation of the bloom-promoting environment.

The use of seawater also provides the algae with a physiological excess of nutrients, including nitrate, phosphate, trace elements and bicarbonate. Unlike traditional raceway systems which require constant and careful addition of nutrients for a static algal population, the addition of seawater is simple and relatively inexpensive. Where available, the cultivation of algae in high nutrient load desalinated brine can be used deter potentially competitive organisms that are incompatible with a hypersaline environment.

Furthermore, the regular flow of seawater through the raceway ponds acts to buffer the pH and bicarbonate ion concentration of the algal growth medium. Traditional raceway ponds and PBRs require active management of pH swings as the high cell densities of algae rapidly consume minerals, in particular bicarbonate. A regular flow of fresh seawater provides fresh buffering capacity and prevents extremes of pH which promotes algal growth by preventing the algae from becoming stressed. The use of fresh seawater as a nutrient source and pH buffer in this way reduces the capital expenditure required for the control of the algal growth medium within the raceway ponds, thereby dramatically reducing the operational cost of a large-scale algal farm.

Given the diurnal growth cycles of bloom algae are synchronised with both the light (Bruyant et al., 2005) and coordinated with nutrient absorption cycles (Levitan, et al., 2010), the depth of the ponds can be adjusted on a timed cycle to recreate the conditions necessary to retain and reinforce this synchronisation. In one embodiment this can be accomplished by increasing the pond depth of the growth ponds with fresh seawater before they are transferred to the next larger growth pond the subsequent day. The timing of the increase in water depth in the raceway pond will depend on the algal species.

For example, for bloom forming flagellates at the end of peak photosynthesis, which occurs shortly after the time of peak solar irradiation, e.g. after 2 PM in the afternoon, the pond depth is increased by addition of fresh seawater at the rate of 10-50 cm per hour, for example 30 cm per hour, for 2-7 hours, e.g. 5 hours to reach a final depth of 150 cm-200 cm, e.g. 180 cm, by dusk, which may occur at about 7 PM in the evening. In one specific embodiment, when the end of peak photosynthesis is at 2 pm and dusk is at 7 pm, at 3 PM the ponds are 60 cm deep, at 4 PM the ponds are 90 cm deep, at 5 PM the ponds are 120 cm deep, at 6 PM the ponds are 150 cm deep and at 7 PM the ponds are 180 cm deep.

This has several advantages. Firstly, since the dilution of the cells coincides with the dilution with fresh seawater, new nutrients are available at the time they are most needed to support cellular growth, as opposed to carbon fixation (during photosynthesis during the preceding 1-3 hours). Secondly, since the increased cultivation depth at the time of dusk reaches nearly two meters, the underwater red (630-680 nm): far red (700-750 nm) and the blue (400-450 nm):red (630-680 nm) light ratios are sufficiently altered (Ragni & Ribera D'Alcala, 2004) to enable light field signalling (Lopez-Figueroa, 1992, Hughes et. al., 1984; Dring 1988) similar to real-world growth conditions (as opposed to those in fixed depth raceways). Thirdly, the $CO_2$ that is excreted by the algae overnight, is accumulated and dissolved in the dilute growth medium during the dark hours, making it available for reabsorption the following morning. Fourthly, the ponds then are hydraulically loaded (at a higher elevation than the receiving pond) for discharge the following morning, after sunrise (to ensure the appropriate dawn light signalling), for example at dawn (e.g. 6 AM) to be rapidly drained into the subsequent growth pond with greater than or equal to four times the volume of the preceding pond at a flow rate draining the pond at 90 cm per hour to drain the pond and expose the algal cells to maximum light irradiation at the peak of their photosynthetic efficiency.

This control of timed light signalling and nutrient addition is a key feature of this embodiment of the current invention, to maintain the reinforcement of cellular growth synchronisation and the maintenance of the exponential growth phase.

In an alternative embodiment, to reinforce synchronisation in green algae, the pond can be filled after dusk, e.g. at 7 pm or later, and drained into the subsequent growth pond at least one hour before dawn, e.g. at 5 AM, to reduce red light (630-680 nm) exposure and increase the relative and overall exposure to blue light (400-450 nm) to delay the commitment point for cell division (after which cells can complete the cell cycle independent of light) to shift this later to increase cell size, which in turn allows for two division rounds the following day (Oldenhof et al, 2006).

In a third embodiment, for the growth of cyanobacteria, it is desirable to manage the activity of the Mehler reaction which has been shown to be independent of the cell cycle and explain 50-60% of the light stimulated oxygen uptake at irradiances equal to or exceeding the growth irradiance (Calquin et al., 2004). The Mehler reaction is where photosynthesis is used for nitrogen fixation, during which the oxygen produced by PSII is reduced again after PSI. This is particularly relevant in desert high light environments where light energy is available in excess of the light needed to support carbon fixation and cellular growth. Nitrogen fixation can be deliberately used to reduce the nutrient requirement for filamentous cyanobacteria. In this embodiment, the ponds are kept at a constant and low depth of 20-50 cm, e.g. 30 cm, at all times to maximise light and air exposure for nitrogen fixation and the harvesting of excess energy to fuel this fixation, thereby reducing nutrient costs.

Similarly, an embodiment for the bloom forming flagellates, where at the end of peak photosynthesis, e.g. after 2 PM in the afternoon, increase in water depth is used to disconnect the nutrient cycle from the light cycle. As above, the pond depth is increased by addition of fresh seawater at the rate of 10-50 cm per hour, for example 30 cm per hour, for 2-7 hours, e.g. 5 hours to reach a final depth of 180 cm by dusk, e.g. 7 PM in the evening. In a specific embodiment, when the end of peak photosynthesis is at 2 PM and dusk is at 7 PM, at 3 PM the ponds are 60 cm deep, at 4 PM the ponds are 90 cm deep, at 5 PM the ponds are 120 cm deep, at 6 PM the ponds are 150 cm deep and at 7 PM the ponds are 180 cm deep. The disconnection of the nutrient and light cycle is achieved because in the afternoon when the cells have accumulated metabolic energy during the hours of peak photosynthesis and are using this energy to reduce nitrate to ammonium in the hours with less photosynthetic productivity and in the dark (Dugdale & Goering, 1967). Here the addition of additional seawater at the end of the day also provides fresh nitrate for the cells to absorb, convert and exploit for protein synthesis and mimics natural bloom former migration patterns (Flynn & Fasham, 1997). The rate of nutrient conversion can be modelled (Flynn & Fasham, 2003), to fine tune the control of the timing and duration of the nutrient addition.

The ratio of carbon to nitrogen in the algal cells is an important indicator of the ability to fix new carbon, from the seawater and the atmosphere, versus already existing carbon, that was excreted as a result of metabolism that the algal cells performed in the dark and excreted into the seawater (Levitan et al., 2010). Carbon that is accumulated during peak photosynthetic productivity can be allocated to cellular growth, nitrogen fixation or TEP production and other activities. Therefore, the ratio of carbon can increase relative to nitrogen during peak photosynthesis, and decrease when cellular metabolism dominates. This ratio can be measured and used to ensure for example optimal mixing regimes, that at night, when cells are emitting 'old' (previously absorbed) carbon, the flow rate of the ponds is reduced to 5-15 cm/sec, e.g. 10 cm/sec, to prevent outgassing and loss of the dissolved $CO_2$. Similarly, the ratio can be used to determine the timing and the rate of dilution and/or transfer of the algae. For example, it is desirable to dilute the algae with fresh seawater after the highest carbon to nitrogen ratio is attained, to enable the cells to absorb nutrients for protein and biomass synthesis, and subsequent cellular division.

Seed Ponds and Photobioreactors

In one embodiment, the first stage of covered raceway ponds is seeded with algae cultivated in a photobioreactor (PBR) or a seed pond.

A PBR achieves a highly controlled environment within the reactor to maintain an uncontaminated stock culture. In order to prevent contamination with competing organisms, bacterial and viral infection, or predatory organisms that reduce the yield or availability of the seed algae, a PBR preferably uses sand and membrane filtered, pre-treated and decontaminated seawater. The exchange of gases is carefully controlled, for example by sparging or bubbling $CO_2$ into the reactor, and removing excess $O_2$. The addition of nutrients and the removal of waste products is also carefully controlled. Preferably, a PBR operates in a sterile environment.

A seed pond is an open or closed pond, preferably a closed raceway pond, in which the growth conditions for the algae can be controlled. The seed pond is used to grow a population of algae sufficient to seed the first stage of covered raceway ponds.

In one embodiment, the first stage of covered raceway ponds is seeded with algae from a PBR or seed pond in the early morning, e.g. from one hour before to two hours after dawn to enable the algae to exploit their new growth environment, right after they have divided in the predawn hours, for example 1-2 hours before dawn. In a particular embodiment, the first stage of covered raceway ponds is seeded between 1-2 hours before and 1-2 hours after dawn, e.g. between 1 hour before and 2 hours after dawn, or in a specific embodiment when dawn is at 6 AM, the seeding occurs between the hours of 5 AM to 8 AM. Cell division can be quantified and validated with fluorescent dyes and flow cytometry. The timing of this transfer is dependent on and matched to the natural light cycle to induce and maintain synchronisation of cell division. So if the first transfer happened at dawn on a first day, then the subsequent transfer to the next stage pond on the following day will be also be at dawn. In a specific embodiment, the first seeding step takes place at 6 AM, and then the subsequent transfer to the next stage pond on the following day will be at 6 AM and the following day at 6 again.

Harvesting Algae

In one embodiment, the method of the invention further comprises the step of harvesting the algae. Traditional algal culture methods aim to keep algae at their optimum growth stage to maintain a continuous high density of algae, from which product algae are continuously harvested to maximise the utilisation of the high capital expense equipment. Furthermore, the harvest of the entire water column requires that the entirety of the output of the growth ponds is centrifuged requiring a large amount of energy. The present invention uses a different approach. Algae grown using the method and series of connected raceway ponds of the present invention experience a full algal lifecycle by being maintained in the exponential growth phase before being transitioned into the stationary growth phase, mimicking the natural progression of algae at the end of their oceanic blooms.

In one embodiment of the present invention, algae are not continuously harvested from the covered or open raceways ponds in their exponential growth phase, but are transitioned into the stationary growth before being harvested in batches. By allowing the algae to transition into the stationary phase prior to harvesting, the algae's natural tendency to aggregate and form marine snow at this stage of its lifecycle can be utilised, as aggregation makes harvesting the algae much easier.

Prior to harvesting, in one embodiment the algae are transferred from an open raceway pond into a harvesting pond. In a particular embodiment, algae are transferred after reaching a maximum density of 500,000-1,000,000 cells/ml. A harvesting pond is an open raceway pond that has been modified in order to slow the rate of algae growth and to induce a change in the algae from the exponential growth to the stationary phase. In other words, a harvesting pond is not designed to support exponential growth of the algae. In one embodiment, the total volume of the harvesting ponds is 100-200% of the total volume of the final stage of covered ponds. In one embodiment, the initial cell density of algae in the harvesting ponds is between 1,000,000-2,000,000 cells/ml. This algae cell density is significant higher than in the preceding open raceway ponds after the cells go through one or two additional divisions, transitioning into stationary growth and slow in their division rate.

Further modifications may be made to the final harvesting ponds in order recreate environmental conditions experienced by algae during the collapse of natural blooms, where all growth ponds drain into at least one or more harvesting ponds that are operated to promote the transition into a different physiological state that promotes the formation of floc, for the harvesting of algae.

Preferably, a harvesting pond is deeper than the preceding open raceway pond. For example, a harvesting pond may be 0.8, 1, 2, 3, 4, 5, or 10 m deep. This increase in depth reduces the algal exposure to solar irradiation, which in turn reduces algal growth (thereby encouraging the algae to transition from the exponential growth to the stationary phase). Algae in harvesting ponds are also starved of nutrients in order to slow and ultimately halt algal growth. This means no additional nutrients are added, and no fresh seawater is added since the volume of the harvesting pond only accommodates the volume of the water added from the growth ponds.

The rate of agitation within a harvesting pond is lower than the preceding covered and open raceway ponds. In one embodiment, the speed of the paddlewheel is reduced to provide a flow rate of less than 25-30 cm/sec. For example, the flow rate is reduced to approximately 10-15 cm/sec. The algae can also be induced to change from the exponential growth phase to the stationary phase by changing the colour of the pond lining. In one embodiment, the lining of the harvesting pond is green, to induce phototaxis in flagellates (Hader and Lebert, 1998; Sineshchekov and Govorunova, 2001), to migrate upwards and induce the algae to aggregate for example for the purpose of accelerated harvesting.

Harvesting single cell algae can be difficult due to their small cell size. Therefore, in one embodiment, algae are aggregated prior to being harvested since aggregates of the algae rapidly settle and can be much more easily harvested. Aggregation may occur naturally as the algae mature. *E. huxleyi* algae has a tendency to aggregate naturally when mature, by releasing long extra-cellular organic molecules called Transparent Exopolymer Particles (TEPs). Long chain organic precursor to TEP molecules start to be released during exponential growth. However, when cellular senescence sets in during the stationary phase, these precursor molecules being to coagulate with cellular debris to form sub-micron aggregates and gels, that when agitated, form TEP. Certain diatoms, such as *Phaeodactylum tricornutum*, and cyanobacteria, such as *Synechococcus*. sp. excrete a cell coating which forms free TEP when pieces slough off, often during the decline of a natural bloom. Mucus from the surface of diatom cells may also enhance the formation of free TEP.

Aggregation can be further encouraged by the addition of flocculants and coagulants such as alum and polymeric flocculants to further accelerate the formation of "marine snow". Marine snow is used to describe the continuous shower of mostly organic detritus (including dead or dying marine animals and plants, plankton, protists (diatoms) fecal matter, and inorganic dust) falling from the upper layers of the water column in the deep ocean. In the context of the present invention, marine snow includes the waste products of the algae, and any other particulates or materials that result in aggregation of the algae.

In an alternative embodiment, supplemental algae such as diatoms may be added to the algae to be harvested, in order to encourage the formation of marine snow. *Phaedactylum tricornutum* is a diatom that produces small molecule precursors to TEP. Combining 2-5% (of the total cellular density of a harvesting pond) of *Phaedactylum tricornutum* with the product algae in a harvesting pond encourages the formation of marine snow, and algae aggregation.

In an alternative embodiment, 2-10%, for example 6% of the algae in the exponential phase are pumped from an open raceway pond into a separate raceway pond. In a specific embodiment, this pond has channels that are about 200 m long×12 m wide. The algae are then transitioned into the stationary phase using any of the tactics described above (such as starving the algae of nutrients and/or reducing solar irradiation). These "harvest-promoting algae" are allowed to mature for 2-5 days, for example 3 days, during which time they transition from the exponential phase to the stationary phase and begin to slough off TEP precursors that concentrate the algal growth medium. After 3 days, a portion of the volume of the pond, for example 30%, is actively pumped into a harvesting pond, which promotes the formation of further marine snow and aggregation. The volume of the pond may be pumped by any suitable means, but in a specific embodiment an Air Sparged Hydrocyclone (ASH) unit it used.

Once the algae have aggregated and marine snow has formed, the algae must be removed from the harvesting ponds. This is usually achieved by using flotation and mechanical skimmers to remove the product algae and marine snow from the surface of the water. Flotation techniques are preferably used to encourage the algae and marine snow to the surface of the water. In one embodiment, the aggregates are rapidly floated to the surface using fine bubble aeration. This is accomplished by placing long rows of fine bubble aerators along the bottom of the harvesting ponds to create rows of bubble curtains which carry all suspended particles to the surface. Alternatively, Air Sparged Hydrocyclones (ASHs) may be used to produce microscopic bubble aeration, to form bubbles that are much smaller and have a much larger surface area than bubbles formed through standard fine bubble aeration. An ASH also brings any coagulants and flocculants used in closer contact with algal cells thereby further encouraging the formation of marine snow and aggregation.

Certain small cell species of algae such as blue green algae or *Dunaliella* sp. do not easily form aggregates. An alternative embodiment uses predatory organisms to ingest the algae.

The predatory organisms (harbouring the product algae) are then easier to harvest because of their larger size. In a preferred embodiment, microzooplankton are used to efficiently aggregate hundreds of algal cells in a feeding cycle, before being themselves easily harvested. For example, *Noctiluca scintillians* is a microzooplankton that is a predatory dinoflagellate that drags a mucus thread through the water as it ascends. It reaches diameters of half a millimeter and can ingest hundreds of algal cells in one growth cycle before it divides.

The microzooplankton are grown in separate ponds to the raceway ponds of the present invention, and may be fed with a small percentage (1-3%) of the algae in the penultimate set of open raceway ponds in order to enter the exponential growth phase. Prior to being introduced into the harvesting ponds, the microzooplankton are underfed for a minimum of three days. In the specific case of the microzooplankton *Noctiluca scintillians*, this results in the dramatic increase of cellular size and thereby increases the harvestability of the cells. Once the microzooplankton are pumped into the harvesting ponds they feed on the algae for up to 12-24 hours before the predatory cells divide at which point they are harvested. A further advantage of using microzooplankton is that it enables the accumulation of algal biomass while also increasing the relative protein content of the final harvested product. *Calanus* sp. and other copepods can also be grown separately from the product algae and introduced into the harvesting ponds to accumulate biomass that will not otherwise aggregate.

The deliberate addition of predatory organisms to accumulate and concentrate the algae into an easier to harvest organism may produce an organism with an advantageous nutritional profile. For example, copepods may be used, which have a protein content of 44-53% making them an attractive product themselves.

Maintenance of the Raceway Ponds

The method and series of connected raceway ponds of the present invention produce sequential batches of algae as opposed to the steady state continuous harvesting of algae that is traditionally utilised in algal culture. This means that batches of algae can be separated according to need. For example, as the algae pass through the series of connected ponds, trace contamination from the air or other sources may occur, particularly in the open raceway ponds. However, the series of connected raceway ponds of the present invention is inherently resilient, because small degrees of contamination do not matter as none of the product algae is reintroduced and all of the contaminants are eventually washed out of the system. Furthermore, in one embodiment the dilution of the algae through the repeat addition of seawater also dilutes any contaminants present.

Raceway ponds in the series are connected to allow algae and water to flow from one raceway pond to another, but each pond can be isolated when required. This is particularly useful to allow the ponds to be cleaned to remove sediment or biofilm formation. Therefore, between batches of algae in different raceway ponds, where algae are transferred every 2, 3, 4, 5, 6, 8, 10, 12, 24, 36 hours, 2 days, 3 days, 5 days or 10 days apart, a cleaning shift can be introduced wherein each raceway pond in the series is sequentially pumped dry, cleaned, for example with truck-mounted rotating brushes, and flushed with water. A cleaning cycle can be performed once a month, and every several cleaning cycles an extra day may be introduced to add a day for drying the ponds. Equipment can be cleaned with 0.0001-0.01% peroxyacetic acid before it is seeded with algae from the raceway pond in the preceding stage in the series, and topped up with fresh water. In this manner, a running cleaning wave can travel through the entire series of connected covered and open raceway ponds (and the harvesting ponds if desired). This may be scheduled according to the prevalence of oceanic contaminants coming in with the fresh seawater or environmental perturbations such as rainfall or sandstorms.

Algae

In one embodiment, the cultivated algae is a single species selected from the group consisting of freshwater algae such as *Chlorella vulgaris, Spirullina* sp., or *Cryptomonas ovate*; brackish species like *Nannochlorpsis gaditana, Nannochloropsis oculata*; marine species such as *Skeletonema costatum, Chaetoceros gracilis* marine diatoms, *Tetraselmis* sp., *Isochyrsis galbana*, or *Rhodomonas minuta*, or hypersaline species like *Dunaliella salina*. Although in nature pure monocultures are never found since algal blooms are able to thrive in complex oceanic communities, none of the currently proposed or used algal mass-culture schemes are designed to cultivate more than one species in the same system. On occasion, this happens spontaneously when local organisms contaminate and outcompete the cultured organisms. However, since these commercial product algae are chosen for their high-lipid content, organisms with another lipid profile are removed. In one embodiment of the present invention, combinations of algae are cultivated in the same series of ponds, to create an algal product with a particular protein or carbohydrate, not obtainable from a single algal species.

For example, a combination of *Dunaliella salina* with *Nannochloropsis* produces an algal product with enhanced properties relative to each individual species. *Nannochloropsis* species is a rapidly growing eustigmatophyte that can build up a high oil content in high light, which complements *Dunaliella salina* species that creates large quantities of protein and beta-carotene in more saline waters towards the end of its growth cycle. This combination therefore produces a high-protein algae product with a high oil content. Combinations of algae may be grown from the outset, for example by seeding the first covered raceway pond in the series of connected raceway ponds with different species of algae from different PBRs and/or seed ponds. Alternatively, the separate species can be grown in parallel and combined 1, 2, 3, 4, 5, 6, 7 days, 1 week, or 2 weeks before harvesting, to engender an optimal growth environment for each of the species separately, or in combination.

As discussed in relation to harvestability, combinations of algae can either be cultivated together from the outset, or grown in parallel then mixed, in order to create a population of algae that will change the population's physiological state and promote the formation of TEP and marine snow and become more readily harvestable. For example, *Phaedactylum tricornutum* may be combined with another species of algae to encourage the algae to aggregate and form marine snow.

The skilled person will appreciate that, within the scope of the present invention, different species of algae will require different modifications of the growth environment in order to maintain the particular species of algae in the exponential growth rate phase. However, the skilled person would easily be able to adapt the claimed method and series of connected raceway ponds to suit the particular species of algae being cultivated. For example, the addition of deep cold seawater to dilute the algae may not be suitable for algae which naturally bloom in warm brackish water such as *Nannochloropsis gaditana*. In this case, the seawater could be warmed, diluted with freshwater and/or otherwise modified to an appropriate temperature and/or salinity by any suitable means, for example by being passed through a greenhouse prior to being added to the pond.

Other modifications could be made without the use of inventive skill. For example, species of algae which flourish in more turbulent environments may require more agitation during the exponential growth phase than can be provided by the use of a paddle wheel and changes in the cross section of the raceway pond. In this scenario, other methods of agitation such as using a bubble aerator to mix the algae may be employed.

It will be appreciated that any feature that is described herein in relation to any one or more aspects of the invention may also be applied to any other aspect of the invention.

EXAMPLE

Model Layout

Figure 2:
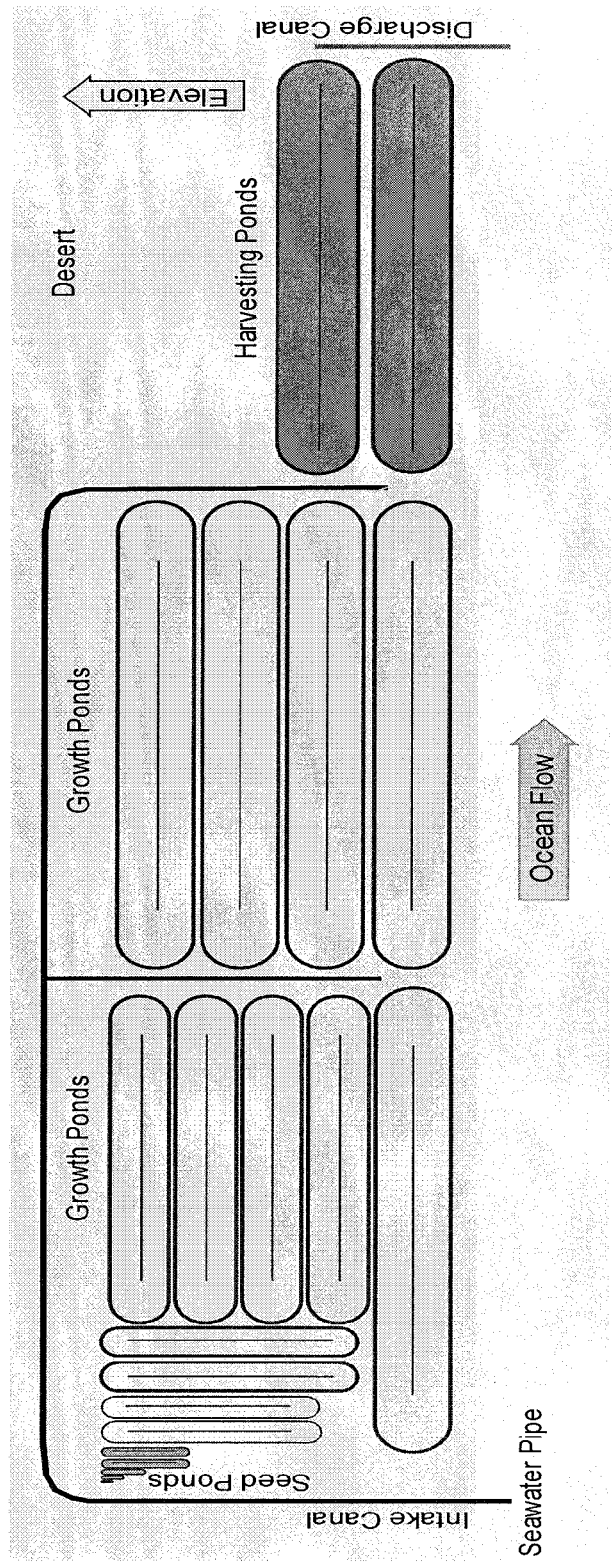
FIG. 2: a series of connected raceway ponds arranged in stages according to the present invention. The schematic outlines:
Seawater pipe—to gain access to nutrient replete deep water off-shore
Elevated intake canal filled from seawater pipe with high-rate, low-head pumps
Covered sequential seed ponds filled with filtered seawater to grow inoculum for growth ponds
Uncovered, sequential growth ponds connected with and filled from previous pond plus fresh seawater from intake canal
Unutilised land, desert or coastal land, near ocean
Harvesting ponds filled with medium from growth ponds
Low elevation discharge canal at maximum distance from intake

FIG. 2 illustrates the layout of a specific algal cultivation system of the invention, including the seawater pipe that is used to fill an elevated seawater canal. This seawater canal feeds a series of raceway ponds. Each pond has a connection to at least the elevated seawater canal and a lower lying subsequent pond through a gate controlled sluice pond discharge. The series of ponds commences with small covered seed ponds to grow the inoculums. Each subsequent pond has at least twice the capacity of the previous pond to hold the entirety of the volume of the previous pond and the equivalent volume of unused seawater. The layout in FIG. 2 has two stages with four channels including the "return channel"). One set of raceway pond with eight channels, including the "return channel, and one set with 10 channels including the "return channels". This final set drains into two large and deep harvesting ponds with a total of four channels. The advantage of this oblong layout is that it efficiently hugs the coast along the edge of an ocean and enables each pond to have at least one contact with the elevated seawater canal and a discharge into the next larger and lower pond. This layout enables the water transfer within the entire pond system to rely on gravity feeds and requires a minimum of piping, while enabling easier maintenance of the ponds. This layout also takes advantage of the frequently encountered natural gradient along coastlines where distance from the shore commonly results in a slight increase in elevation. Finally, the intake manifold is upstream and as far as possible from the discharge system to avoid reuptake of already spent seawater.

Model System

The following preferred embodiment is based on a series of connected covered and open raceway ponds with dimensions outlined in Table 1.

TABLE 1

| Stage | Length/ m | Width/ m | Depth/ m | Channels | Pond type* | Number of ponds |
|---|---|---|---|---|---|---|
| 1 | 2 | 0.125 | 0.3 | 2 | Covered | 1 |
| 2 | 4 | 0.250 | 0.3 | 2 | Covered | 1 |
| 3 | 8 | 0.500 | 0.3 | 2 | Covered | 1 |
| 4 | 16 | 1.000 | 0.3 | 2 | Covered | 1 |
| 5 | 32 | 2.000 | 0.3 | 2 | open | 1 |
| 6 | 82 | 5.125 | 0.3-2.0 variable | 2 | Open | 1 |
| 7 | 115 | 7.188 | 0.3-1.5 variable | 4 | Open | 2 |
| 8 | 162 | 10.125 | 0.3-1.0 variable | 8 | Open | 4 |
| 9 | 230 | 14.375 | 0.3-1.0 variable | 16 | Open | 8 |

*all ponds are raceway ponds

An exemplary series of ponds is outlined in Table 1.

Each of stages 1-5 comprises one raceway pond which is covered by a greenhouse. Each covered pond has two channels and is connected to the subsequent pond, although the ponds can be isolated by gates if required. Each successive covered raceway pond in the series is longer and wider than the previous covered pond, therefore has a greater volume. In this particular embodiment, the volume of each covered raceway pond is four times greater than the volume of the preceding pond, therefore the dilution rate of the algae is four-fold at each transfer. The covered raceway pond at stage 4 is connected to the open raceway pond at stage 5. The covered raceway ponds of stages 1-5 all have a depth of 0.3 m.

Stages 5-9 comprise open raceway ponds. Each open raceway pond is connected to the subsequent open raceway pond (s), although the ponds can be isolated if required. The pond at stage 6 has two channels and is larger in volume than the pond at stage 5. The open raceway pond at stage 6 is then connected to two open raceway ponds at stage 7. The two open raceway ponds at stage 7 have identical dimensions, and each open raceway pond has four channels and a larger volume than the open raceway pond at stage 6. The collective volume of the two covered raceway pond at stage 7 is four times greater than the volume of the open raceway pond at stage 6; therefore the dilution rate of the algae is four-fold when the algae are transferred from stage 6 to stage 7.

Each open raceway pond at stage 7 is then separately connected to two open raceway ponds at stage 8, giving a total of four open raceway ponds at stage 8. The four open raceway ponds at stage 8 have identical dimensions, and each open raceway pond has eight channels and a larger volume than the open raceway ponds at stage 7. The collective volume of the four open raceway pond at stage 8 is four times greater than the collective volume of the open raceway ponds at stage 7; therefore the dilution rate of the algae is four-fold when the algae are transferred from stage 7 to stage 8.

Each open raceway pond at stage 8 is then connected to two open raceway ponds at stage 9, giving a total of eight open raceway ponds at stage 9. The eight open raceway ponds at stage 9 have identical dimensions, and each open raceway pond has sixteen channels and a larger volume than each of the open raceway ponds at stage 8. The collective volume of the eight open raceway ponds at stage 9 is four times greater than the collective volume of the open raceway ponds at stage 8; therefore the dilution rate of the algae is four-fold when the algae are transferred from stage 8 to stage 9.

The depth of the open raceway ponds is an average of 0.3 m. However, in order to induce a non-uniform flow rate, each pond has at least one channel that is significantly shallower than its adjacent channel. In this example, one channel is 0.30 m deep and its adjacent channel is 1 m deep. This non-uniform depth results in a varying flow rate through the pond, thereby mimicking natural algal bloom conditions. This non-uniformity also varies the amount of solar irradiation the algal receive, with algae in the 0.30 m sections of the pond receiving greater solar irradiation than the algae in the 1 m sections of the pond. This difference in depth mimics the natural algal migration from the surface (to receive greater solar irradiation) to the deeper, more nutrient rich water, thereby mimicking bloom physiology which maintains the algae in the exponential growth phase. Similarly, the width of the channels in the open raceway ponds is also varied, so that the ponds are not symmetrical. Thus, in each open raceway pond, at least one channel is wider than its adjacent channel. For example, one channel is 1.5 times the width of the adjacent channel. This change variation in width of the channels results in a varying flow rate through the pond, thereby mimicking natural algal bloom conditions.

In this inventive example, the entire volume of each covered and open raceway pond is replaced within two days, which allows for two cell divisions per pond. Each transfer of the algae between the different dilution stages involves at least a four-fold dilution; therefore the same cell density of algae can be maintained throughout the series of ponds. Since the algae remain in each pond for approximately two days, one batch of algae will pass through stages 1-9 in approximately 18 days. Since each transfer of the algae between the different stages involves at least a four-fold dilution, the new water that is used to fill a pond is 75% fresh seawater and 25% of the algal growth medium from the previous covered or open raceway pond. This exchange and flow of the entire volume of the ponds' algal growth medium is at a much higher rate than in traditional raceway ponds, where the exchange of the entire volume of a pond commonly takes up to eight days and may take longer.

This preferred embodiment of the invention utilises fresh seawater from depth that is pumped through a closed pipeline, at a significant distance from off-shore. The seawater is pumped at a significantly higher rate than any in other raceway pond, PBR or current algal culture methods. For example, to maintain the series of ponds of the preferred embodiment which approximately 100,000 m$^2$ of raceway ponds, the volume of seawater pumped through the system exceeds 37.5% of the entire volume of the covered and open raceway ponds daily.

The flow within the covered and open raceway ponds is maintained by one or more paddlewheels in each covered and open raceway pond. The paddlewheels usually as wide as the width of the raceway pond used, and are positioned at one end of the pond to maintain laminar flow throughout the length of the covered or open raceway pond at a rate of about 30 cm/sec. In this preferred embodiment, algal cells cycle the length of the raceway pond approximately 100 cycles/day without experiencing significant shear. At this flow rate, oxygen that is produced by the algae can readily equilibrate and prevent the build-up of reactive $O_2$ species that contribute to photoinhibition (Falkowski et al, 1985). Similarly, through this active atmospheric interference, the seawater within the raceway ponds can absorb and dissolve significant amounts of $CO_2$, which lowers the $CO_2$ input costs for these raceway ponds. Both the atmospheric $CO_2$ and the bicarbonate ions provided by the regular addition of fresh seawater at each stage are important sources of $CO_2$ for the algae to grow and maintain their exponential growth. Thus in combination with the overall lower algal cell density, the overall cost for providing additional $CO_2$ for the algae may be reduced by 66% or indeed eliminated altogether.

Algae grown in this preferred embodiment are a single species *Rhodomonas minuta*. The covered pond at stage 1 is seeded with algae grown in a PBR. The PBR has independent sand and membrane-filtered, pre-treated and decontaminated seawater input, nutrient feed and controlled gas introduction. Once a sufficient volume of the seed algae has been produced, approximately 1,000 l of algal growth medium at a cell density of 750,000 cells/ml is transferred to the green house covered raceway pond at stage 1, 1 where the cells transition into the new growth medium for up to four days. As described above, the algae spend two days in each covered raceway pond at stages 2-4, where the algae transition into their exponential growth phase. The algae then pass through the open raceway ponds of stages 5-9, where successive dilution, changes in the depth and width of the pond, and other factors are modified in order to maintain the algae in their exponential growth phase, mimicking the physiological conditions experienced by algae in a natural oceanic bloom.

By the time the algae have reached the eight open raceway ponds of stage 9, approximately 18 days after the inoculation of the covered raceway pond at stage 1, the algae will have reached a maximum density of 500,000-1,000,000 cells/ml and are ready to be harvested. Prior to being harvested, the algae are transferred from the eight open raceway ponds of stage 9 into two, one meter deep harvesting ponds. Each harvesting pond is has two channels that are 23 m in width and 180 m in length. The collective volume of the harvesting ponds is marginally greater than the collective volume of the eight open raceway ponds at stage 9 to accommodate fluctuations in flow. However, there is no additional dilution of the algae when the algae are transferred from stage 9 to the harvesting ponds. In this preferred embodiment, one batch of algae provides a biomass of 3,900 kg after drying of the algae.

The harvesting ponds are also open raceway ponds' but differ from the open raceway ponds of stages 6-9 in a number of ways in order to induce the algae to transition from the exponential to the stationary phase of growth prior to harvesting. The harvesting ponds are deeper than the open raceway pond of stages 6-9 in order to reduce solar irradiation sufficiently such that the algae cannot maintain exponential growth. No fresh seawater is added to the harvesting ponds and no additional nutrients are added, therefore the algae are nutrient starved and cannot sustain exponential growth. The paddlewheel speed is reduced such that the flow rate of the algal medium is 10-15 cm/sec. This reduction is algal growth medium flow rate reduces algal agitation and gas exchange therefore encourages the algae to transition into the stationary phase. The lining of the harvesting ponds is green which also has the effect of transitioning from the exponential phase into the stationary phase.

Before the algae are harvested they are encouraged to aggregate to form marine snow. The reduction in flow rate initially encourages the algae to aggregate, and in this preferred embodiment, the algae are further encouraged to aggregate by lining the pond with a green liner, and by using supplemental algae to encourage aggregation.

REFERENCES

1) Burlew, J. S. (1953). Algal culture from laboratory to pilot plant. Carnegie Institute of Washington, Washington, D.C., Publication 600, pp. 357

2) Gershwin, M. E., and A. Belay *Spirulina* in Human Nutrition and Health, CRC Press, Boca Raton, Fla. (2007)
3) Lundquist, T. J., Woertz, I. C., Quinn, M. W. & Benemann, J. R. A Realistic Technology and Engineering Assessment of Algal Biofuel Production. Energy Biosci. Institute Report (2010)
4) Oswald, W. J. and Gotaas, H. B. Photosynthesis in Sewage Treatment, Paper presented before the Sanitary Engineering Division, American Society of Civil Engineers, NY, NY (1957)
5) Oswald, W. J. and Golueke, C. Biological transformation of solar energy, Adv. Appl. Microbiol. (2), 223-262 (1960)
6) Campbell, P. K., Beer, T. & Batten, D. Greenhouse Gas Sequestration by Algae—Energy and Greenhouse Gas Life Cycle Studies. Proceedings of the 6th Australian Conference on Life Cycle Assessment (2009)
7) GB 2464763 Jovine, R. V., Method for Carbon Sequestration
8) Harder, R., and K. von Witsch, Ober Massenkultur von Diatomeen, Ber. Deut. Bot. Ges. 60, pp. 146-152 (1942)
9) Benemann, J. R. and W. J. Oswald (1996). Systems and economic analysis of microalgae ponds for conversion of $CO_2$ to biomass. Final report, U.S. DoE. www.osti.govbridge-servlets-purl-493389-FXQyZ2-webviewable-493389.pdf
10) Sheehan, J., Dunahay, T., Benemann, J., Roessler, P., and Weissman, J., Look Back at the U.S. Department of Energy's Aquatic Species Program: Biodiesel from Algae; Close-Out Report, NREL Report No. TP-580-24190 (1998)
11) Ben-Amotz, A. Industrial production of microalgal cellmass and secondary products—major industrial species. In: Richmond A. (ed.), Handbook of Microalgal Cultures, Biotechnology and Applied Phycology. Blackwell, UK. pp. 273-280 (2003)
12) Vonshak, A., Torzillo, G., Masojidek, J., and Boussiba, S., "Sub optimal morning temperature induces photo inhibition in dense outdoor cultures of the alga *Monodus subterraneus* Eustigmatophyta Plan," Cell and Environment, Vol. 24, pp. 1113-1118 (2001)
13) Ben-Amotz, A. Industrial production of microalgal cellmass and secondary products—major industrial species. In: Richmond A. (ed.), Handbook of Microalgal Cultures, Biotechnology and Applied Phycology. Blackwell, UK. pp. 273-280 (2003)
14) Hoagland, K. D., Rosowski, J. R., Gretz, M. R. et al. Diatom extracellular polymeric substances—function, fine-structure, chemistry, and physiology. J. Phycol., 29, 537-566 (1993)
15) Granum, E., Kirkvold, S, and Myklestad, S. M. Cellular and extracellular production of carbohydrates and amino acids by the marine diatom *Skeletonema costatum*: diel variations and effects of N depletion. Mar. Ecol. Prog. Ser., 242, 83-94 (2002)
16) Prince, E. K., Myers, T. L. and Kubanek, J. Effects of harmful algal blooms on competitors: allelopathic mechanisms of the red tide dinoflagellate *Karenia brevis*. Limnol. Oceanogr., 53, 531-541 (2008)
17) Goldman, J., Outdoor algal mass cultures—II. Photosynthetic yield limitations. Water Res 13: 119-136 (1979)
18) Miyamoto, K. And Benemann, J. R. Vertical Tubular Photobioreactor: Design and Operation, Biotechnology Letter, 10:703-710 (1988)
19) Sukenik, A., Shelaf, G. Algal autoflocculation-verification and proposed mechanism. Biotechnology and Bioengineering. (26), 142 (1984)
20) Ben-Amotz, A. Bio-Fuel and $CO_2$ Capture by Algae, Presented at NASA (2008) https://newbusiness.grc.nasa.gov/wp-content/uploads/2008/12/ben-amotz-nasa-nov-2008.pdf
21) Stephenson, A. L., Kazamia, E., Dennis, J. S., Howe, C. J., Scott, S. A., & Smith, A. G., Life-Cycle Assessment of Potential Algal Biodiesel Production in the UK: A Comparison of Raceways and Air-Lift Tubular Bioreactors, Energy Fuels, 24 (7), pp 4062-407 (2010)
22) Taraldsvik, M. and Myklestad, S. M. The effect of pH on growth rate, biochemical composition and extracellular carbohydrate production of the marine diatom *Skeletonema costatum*. Eur. J. Phycol., 35, 189-194 (2000)
23) Platt, T. & Subba Rao, D. V., Energy flow and species diversity in a marine phytoplankton bloom. Nature 5262: 1059-1060 (1970)
24) Maranon, E., Phytoplankton growth rates in the Atlantic subtropical gyres, Limnol. Oceanogr., 50(1), 299-310 (2005)
25) Barber, R. T. Sanderson, M. P. Lindley, S. T. Chai, F. Newton, J. Trees, C. C. Foley D. G. & Chavez, F. P. Primary productivity and its regulation in the equatorial Pacific during and following the 1991-1992 El Nino, Deep-Sea Research II, 43(4-6), 933-969 (1996)
26) Babin, M. Therriault, J. C. Legendre, L. Nieke, B. Reuter, R. & Condal, A. Relationship between the maximum quantum yield of carbon fixation and the minimum quantum yield of chlorophyll a in vivo fluorescence in the Gulf of St. Lawrence, Limnol. Oceanogr., 40(5) 956-968 (1995)
27) Bruyant, F. Babin, M. Genty, B. Prasil, O. Claustre H. & Bricaud, A. Garczarek, L. Holtzendorff, J. Partensky, F. Diel variations in the photosynthetic parameters of *Prochlorococcus* strain PCC 9511: Combined effects of light and cell cycle, Limnol. Oceanogr., 50(3), 850-863 (2005)
28) Eppley, R. W., Harrison, W. G., Physiological ecology of *Gonyaulax polyedra* a red tide dinoflagellate of southern California In. LoCicero, V. R., (ed) Proc 1st Int Conf Toxic Algae
29) Dinoflagellate Blooms. Massachusetts Science and Technology Foundation, Wakefield, Mass., p 11-22 (1975)
30) Kiefer, D. A., and Lasker, R., Two blooms of *Gymnodinium splendens*, an unarmored dinoflagellate. Fish Bull US 73:675-67 (1975)
31) Ralston, D. K., McGillicuddy, D. J. and Townsend, D. W. Asynchronous vertical migration and bimodal distribution of motile phytoplankton, J. of Plankton Res. 29:9 pp 803-821 (2007)
32) Feng, Y., Warner, M. E., Zhang, Y., Sun, J., Fu, F., Rose, J., Hutchins, D. A. Interactive effects of increased pCO2, temperature and irradiance on the marine coccolithophore *Emiliania huxleyi* (Prymnesiophyceae). European J. of Phycology. Vol. 43 (1), pp. 87-98 (2008)
33) Sanudo-Wilhemy, S. A., Tovar-Sanchez, A., Fu, F., Capone, D. G., Carpenter, E. J., Hutchins, D. A. The Impact of Surface-Adsorbed Phosphorus on Phytoplankton Redfield Stoichiometry. Nature. Vol. 432, pp. 897-900 (2004)
34) Kudela R. M., Seeyave S., and Cochlan W. P., The role of nutrients in regulation and promotion of harmful algal blooms in upwelling systems, Progress in Oceanography 85: 122-135 (2010)
35) Tamiya H., Iwamura T., Shibata K., Hase E., and Nihei T. Correlation between photosynthesis and light-dependent metabolism in the growth of *Chlorella*. Biochim. Biophys. Acta 12: 23-40 (1953)

36) Cattolico R. A., Boothroyd J. C. and Gibbs S. P. Synchronous Growth and Plastid Replication in the Naturally Wall-less Alga Olisthodiscus luteus, Plant Physiol. 57, 497-503 (1976)
37) Weissman, J. C. and Goebel, R. P. Design and Analysis of Pond Systems for the Purpose of Producing Fuels. Solar Energy Research Institute, Golden Colo. (1987)
38) Benemann, J. R. & Oswald, W. J. Systems and Economic Analysis of Microalgae Ponds for Conversion of $CO_2$ to Biomass. Final Report to the Pittsburgh Energy Technology Center (1996)
39) Levitan, O., Kranz, S. K., Spungin, D., Prasil, O., Rost, B., & Berman-Frank, I., Combined Effects of CO2 and Light on the N2-Fixing Cyanobacterium *Trichodesmium* IMS101: A Mechanistic View, Plant Phys. 154:346-356 (2010)
40) Ragni, M., and Ribera D'Alcala, Light as an information carrier underwater, J. of Plank. Res. 26(4):433-443 (2004)
41) Lopez-Figueroa, F. Diurnal variation in pigment content in *Porphyra laciniata* and *Chondrus crispus* and its relation to the diurnal changes of underwater light quality and quantity. P.S.Z.N.I: Mar. Ecol., 13:285-305 (1992)
42) Hughes, J. E., Morgan, D. C., Lambton, C. R., Black, C. R. & Smith, H. Photoperiodic time signals during twilight. Plant Cell Environ., 7:269-277 (1984)
43) Dring, M. J. Photocontrol of development in algae. Annu. Rev. Plant Physiol. Plant Mol. Biol., 39, 157-174 (1988)
44) Oldenhof, H., Zachleder, V., and Van Den Ende, H., Blue- and red-light regulation of the cell cycle in *Chlamydomonas reinhardtii* (Chlorophyta), Eur. J. Phycol., 41(3): 313-320 (2006)
45) Claquin, P., Kromkamp, J. C., & Martin-Jezequel, V., Relationship between photosynthetic metabolism and cell cycle in a synchronized culture of the marine alga *Cylindrotheca fusiformis* (Bacillariophyceae), Eur. J. Phycol. 39(1): 33-41 (2004)
46) Dugdale, R. C. and Goering, J. J. Uptake of new and regenerated forms of nitrogen in primary production. Limnol. Oceanogr., 12:196-206 (1967)
47) Flynn, K. J. and Fasham, M. J. R, A short version of the ammonium-nitrate interaction model. J. Plankton Res., 19:1881-1897 (1997)
48) Flynn, K. J. and Fasham, M. J. R, Operation of light-dark cycles within simple ecosystem models of primary production and the consequences of using phytoplankton models with different abilities to assimilate N in darkness, J. of Plank. Res. 25(1):83-92 (2003)
49) Kraml, M. and Herrmann, H. Red-blue interaction in *Mesotaenium* chloroplast movement—blue seems to stabilize the transient memory of the phytochrome signal. Photochem. Photobiol., 53:255-259 (1991)
50) Furukawa, T., Watanaba, M. and Shihira-Ishikawa, I. Green and blue-light-mediated chloroplast migration in the centric diatom *Pleurosira laevis* Protoplasma, 203; 214-220 (1998)
51) Hader, D.-P. and Lebert, M. The photoreceptor for phototaxis in the photosynthetic flagellate *Euglena gracilis*. Photochem. Photobiol., 68, 260-265 (1998)
52) Sineshchekov, O., Lebert, M. and Hader, D.-P. Effects of light on gravitaxis and velocity in *Chlamydomonas reinhardtii*. J. Plant Physiol., 157, 247-254 (2000)
53) Falkowski P, G., Dubinsky, Z., & Wyman, K., Growth-irradiance relationships in phytoplankton. Limnolog Ocean 30(2):311-321 (1985)

The invention claimed is:

1. A method of manipulating the physiological state of algae cultured in a series of connected raceway ponds arranged in stages by altering one or more environmental parameters to simulate algal bloom forming conditions,
wherein the alteration of the one or more environmental parameters is timed to coincide with a specific point in the algal cell cycle and to deliberately induce synchronization of cellular division of an algal population, wherein the synchronization is maintained through each stage by alteration of the one or more environmental parameters at regular intervals to retain the physiological state of choice, until a harvesting stage is reached
and wherein the alteration of the one or more environmental parameters comprises successively diluting the algae at timed intervals in a controlled manner before or during transfer between stages to maintain a cell density of algae between 1,000 cells/ml and 2,000,000 cells/ml, wherein the dilution is timed to coincide with a particular point in the algal cell cycle and to deliberately induce synchronization of cell division, and wherein the algae remains in exponential growth through each stage.

2. A method according to claim 1, wherein the one or more environmental parameters are additionally selected from the group consisting of:
light intensity;
light wavelength ratio;
nutrient concentration;
nutrient balance;
water temperature;
algal cell density;
concentration of dissolved gasses;
pH and/or
ratio of dissolved gasses.

3. A method according to claim 2, wherein the nutrient balance is the ratio of carbon to nitrogen in the cells.

4. A method according to claim 2, wherein the dissolved gasses are oxygen ($O_2$) and carbon dioxide ($CO_2$).

5. A method according to claim 2, wherein the nutrient concentration, nutrient balance, water temperature, algal cell density, concentration of dissolved gasses and/or ratio of dissolved gasses is altered by the addition of fresh seawater, hypersaline water, desalination brine, brackish water, wastewater or freshwater to the raceway pond.

6. A method according to claim 2, wherein the concentration of dissolved gasses and/or ratio of dissolved gasses is altered by altering the flow rate and/or creating turbulent flow in the raceway ponds.

7. A method according to claim 6, wherein the width and/or depth of an open raceway pond is non-uniform, resulting in a change in the flow rate and/or the creation of turbulent flow through the raceway pond.

8. A method according to claim 1, wherein the algae are cultured in seawater, hypersaline water, desalination brine, brackish water, wastewater or freshwater.

9. A method according to claim 1, wherein a light intensity and/or light wavelength ratio is altered by changing the depth of water in the raceway ponds.

10. A method according to claim 1, wherein the raceway pond is lined, and a light intensity and/or light wavelength ratio is altered by changing the colour of the lining of the raceway pond.

11. A method according to claim 1, wherein the raceway pond is covered and a light intensity and/or light wavelength ratio is altered by changing the colour and/or opacity of the cover of a covered raceway pond.

12. A method according to claim 1, wherein the depth of an open raceway pond is non-uniform, resulting in a change in light intensity and/or light wavelength ratio and/or a change in the concentration of dissolved gasses and/or ratio of dissolved gasses and/or algal cell density within the raceway pond.

13. A method according to claim 12, wherein the alteration in the depth of the raceway pond is timed to coincide with a specific point in the algal cell cycle.

14. A method according to claim 1, comprising culturing algae in a series of connected raceway ponds arranged in stages, said series of connected raceway ponds comprising
firstly, one or more stages of covered raceway ponds; and
secondly, one or more stages of open raceway ponds;
wherein at each successive stage in the series, the raceway ponds have a collective volume greater than the collective volume of the raceway ponds of the preceding stage; and wherein the raceway ponds in each successive stage of the series are seeded by transferring algae grown in the raceway ponds of the preceding stage of the series such that the algae are diluted when transferred between stages in the series.

15. A method according to claim 14, wherein the series of covered raceway ponds comprises 2 to 10 stages of covered raceway ponds.

16. A method according to claim 14, wherein the series of open raceway ponds comprises 2 to 10 stages of open raceway ponds.

17. A method according to claim 14, wherein the number of raceway ponds at each stage in the series of covered raceway ponds and/or open raceway ponds is at least double the number of raceway ponds at the preceding stage in the series.

18. A method according to claim 14, wherein the cell density of algae in each covered raceway pond is between 150,000 cells/ml and 100,000 cells/ml.

19. A method according to claim 14, wherein the entire volume of water in each open raceway pond is replaced every 4 hours to 8 days.

20. A method according to claim 14, wherein the first covered raceway pond is seeded with algae grown in a photobioreactor or a seed raceway pond.

21. A method according to claim 20, wherein said covered raceway pond is seeded with algae between the hours of dusk on a first day and dawn the following day.

22. A method according to claim 14, further comprising the step of harvesting the algae.

23. A method according to claim 22, wherein the algae are aggregated and harvested in batches.

24. A method according to claim 23, wherein the algae are aggregated by:
(i) the addition of flocculants and/or coagulants; and/or
(ii) the addition of supplemental algae to encourage aggregation; and/or
(iii) the addition of predatory organisms.

25. A method according to claim 22, wherein prior to harvesting the algae, the growth rate of the algae is reduced by:
(i) increasing the depth of an open raceway pond; and/or
(ii) introducing the algae into an open raceway pond with a green lining; and/or
(iii) reducing the flow rate of the algae by reducing the speed of the paddlewheel; and/or
(iv) starving the algae of nutrients.

26. The method according to claim 1, wherein two or more environmental parameters are altered to simulate algal bloom forming conditions.

27. A method according to claim 1, wherein successively diluting the algae maintains a cell density of algae between 50,000 cells/ml and 2,000,000 cells/ml.

28. A method according to claim 27, wherein successively diluting the algae maintains a cell density of algae of about 350,000 cells/mL.

29. A method of manipulating the physiological state of algae cultured in a series of connected raceway ponds arranged in stages by dynamically altering one or more environmental parameters to simulate algal bloom forming conditions,
wherein the alteration of the one or more environmental parameters is timed to deliberately induce synchronization of cellular division of an algal population and the synchronization is maintained through each stage by alteration of the one or more environmental parameters at regular intervals to retain the physiological state of choice until a harvesting stage is reached,
wherein the alteration of the one or more environmental parameters comprises successively diluting algae at timed intervals in a controlled manner before or during transfer between stages to maintain a cell density of algae between 1,000 cells/ml and 2,000,000 cells/ml, wherein the dilution is deliberately timed to induce synchonization of cellular division, wherein the algae remain in an exponential growth phase through each stage,
and wherein the alteration of the one or more environmental parameters further comprises alteration of one or more environmental parameter are selected from the group consisting of:
light intensity;
light wavelength ratio;
nutrient concentration;
nutrient balance;
water temperature;
algal cell density;
concentration of dissolved gasses; and/or
ratio of dissolved gasses.

30. A method according to claim 29, wherein successively diluting the algae maintains a cell density between 50,000 cells/mL and 2,000,000 cells/mL.

31. A method according to claim 29, wherein successively diluting the algae maintains a cell density between 50,000 cells/mL and 100,000 cells/mL.

32. A method according to claim 29, wherein successively diluting the algae maintains a cell density of algae of about 350,000 cells/mL.

* * * * *